(12) United States Patent
Kanayama et al.

(10) Patent No.: US 12,247,714 B2
(45) Date of Patent: Mar. 11, 2025

(54) LIGHT EMITTING APPARATUS, LIGHT SOURCE UNIT, AND MOBILE BODY

(71) Applicant: Panasonic Intellectual Property Management Co., Ltd., Osaka (JP)

(72) Inventors: Yoshihiko Kanayama, Hyogo (JP); Toshinao Akie, Hyogo (JP); Ryohei Kimoto, Hyogo (JP); Mitsuhiro Uchida, Osaka (JP); Takao Yoshida, Osaka (JP); Toshiaki Murai, Osaka (JP); Tomoyuki Ogata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/285,363

(22) PCT Filed: Mar. 29, 2022

(86) PCT No.: PCT/JP2022/015429
§ 371 (c)(1),
(2) Date: Oct. 2, 2023

(87) PCT Pub. No.: WO2022/230551
PCT Pub. Date: Nov. 3, 2022

(65) Prior Publication Data
US 2024/0183510 A1    Jun. 6, 2024

(30) Foreign Application Priority Data

Apr. 26, 2021 (JP) ................................ 2021-073891

(51) Int. Cl.
*F21S 41/40* (2018.01)
*F21S 41/25* (2018.01)
*F21W 102/40* (2018.01)

(52) U.S. Cl.
CPC ............... *F21S 41/40* (2018.01); *F21S 41/25* (2018.01); *F21W 2102/40* (2018.01)

(58) Field of Classification Search
CPC ....... F21S 41/40; F21S 41/25; F21W 2102/40
See application file for complete search history.

(56) References Cited

U.S. PATENT DOCUMENTS

| | | | |
|---|---|---|---|
| 6,616,313 B2 | 9/2003 | Fürst et al. | |
| 2020/0099843 A1* | 3/2020 | Kanayama | ............... H04N 5/30 |
| 2020/0241176 A1* | 7/2020 | Kanayama | ......... G02B 19/0061 |

FOREIGN PATENT DOCUMENTS

| | | |
|---|---|---|
| JP | 64-048053 | 2/1989 |
| JP | 03-088480 | 4/1991 |

(Continued)

OTHER PUBLICATIONS

International Search Report issued in International Pat. Appl. No. PCT/JP2022/015429, dated May 31, 2022, along with an English translation thereof.

(Continued)

*Primary Examiner* — Elmito Breval
(74) *Attorney, Agent, or Firm* — GREENBLUM & BERNSTEIN, P.L.C.

(57) ABSTRACT

A light emitting apparatus is supported by a second support supported by a first support laterally relative to the first support alongside an imaging apparatus, and emits light to be detected by the imaging apparatus. The light emitting apparatus includes a light source that emits the light and a lens on which the light emitted from the light source is incident and that transmits the light incident on the lens. The lens includes a part provided with a dimmer that at least partially reduces light to be emitted to the first support out of the light incident on the lens.

21 Claims, 16 Drawing Sheets

(56) References Cited

FOREIGN PATENT DOCUMENTS

| | | |
|---|---|---|
| JP | 2006-7883 | 1/2006 |
| JP | 2009-300871 | 12/2009 |
| JP | 2011-071093 | 4/2011 |
| JP | 2015-071386 | 4/2015 |
| JP | 2020-019303 | 2/2020 |
| JP | 2020-19304 | 2/2020 |
| JP | 2020-121585 | 8/2020 |

OTHER PUBLICATIONS

Extended European Search Report for European patent application No. 22795467.4 issued on Jul. 22, 2024.

* cited by examiner

LIGHT EMITTING APPARATUS, LIGHT SOURCE UNIT, AND MOBILE BODY

TECHNICAL FIELD

The present invention relates to light emitting apparatuses, light source units, and mobile bodies.

BACKGROUND ART

Light emitting apparatuses have been provided for vehicles that are an example of a mobile body to emit light to road surfaces around the vehicles (for example, see Patent Literature (PTL) 1).

For example, PTL 1 discloses a lighting apparatus that is an example of light emitting apparatus provided for a side mirror to illuminate where driver's feet are put outside a vehicle.

CITATION LIST

Patent Literature

[PTL 1] Japanese Unexamined Patent Application Publication No. 2015-71386

SUMMARY OF INVENTION

Technical Problem

For example, in addition to the light emitting apparatus that emits light, the side mirror may be provided with an imaging apparatus that images road surfaces. The imaging apparatus of this type detects reflected light resulting from the light emitted from the light emitting apparatus and reflected from the road surfaces, obstacles, or the like to create images of the road surfaces.

Here, when the imaging apparatus detects an excessive amount of light, halation appears in images created by the imaging apparatus.

The present invention provides a light emitting apparatus and the like that can prevent halation from appearing in images created by an imaging apparatus.

Solution to Problem

A light emitting apparatus according to an aspect of the present invention is supported by a second support supported by a first support laterally relative to the first support alongside an imaging apparatus, and emits light to be detected by the imaging apparatus. The light emitting apparatus includes a light source that emits the light and a lens on which the light emitted from the light source is incident and that transmits the light incident on the lens. The lens includes a part provided with a dimmer that at least partially reduces light to be emitted to the first support out of the light incident on the lens.

Moreover, a light emitting apparatus according to another aspect of the present invention is supported by a second support supported by a first support laterally relative to the first support alongside an imaging apparatus, and emits light to be detected by the imaging apparatus. The light emitting apparatus includes a light source that emits the light, a lens on which the light emitted from the light source is incident and that transmits the light incident on the lens, and a dimmer that at least partially reflects or diffuses light traveling to the first support out of the light transmitted through the lens.

Moreover, a light emitting apparatus according to another aspect of the present invention is supported by a second support supported by a first support laterally relative to the first support alongside an imaging apparatus, and emits light to be detected by the imaging apparatus. The light emitting apparatus includes a light source that emits the light and a lens on which the light emitted from the light source is incident and that transmits the light incident on the lens. Out of the light emitted from the light source, the amount of light traveling to a part of the lens located adjacent to the first support is less than the amount of light traveling to a part of the lens located away from the first support.

Moreover, a light source unit according to an aspect of the present invention includes the light emitting apparatus described above and the imaging apparatus described above.

Moreover, a mobile body according to an aspect of the present invention includes the above-described light source unit, a body portion that is the above-described first support, and a side mirror that is the above-described second support. The light emitting apparatus is attached to the side mirror to emit the light to a road surface. The imaging apparatus detects the light reflected from the road surface to create an image of the road surface.

Advantageous Effects of Invention

The light emitting apparatuses and the like according to the aspects of the present invention can prevent halation from appearing in the images created by the imaging apparatus.

DESCRIPTION OF EMBODIMENTS

Embodiments of the present invention will now be described with reference to the drawings. Note that each of the embodiments described below illustrates a general or specific example. The numerical values, shapes, materials, elements, positions and connections of the elements, and the like shown in the following embodiments are mere examples and are not intended to limit any aspect of the present invention. Moreover, those elements in the following embodiments that are not recited in an independent claim, which defines the most generic concept, are described as optional.

Note that each drawing is a schematic diagram and is not necessarily illustrated in precise dimensions. Each drawing is a schematic diagram in which elements are emphasized or omitted or in which the ratios of the elements are adjusted as appropriate to illustrate the present invention, and the shapes, positional relationships, or ratios of the elements may be different from those of actual elements. Moreover, substantially the same configurations are given the same reference signs throughout the drawings, and duplicate explanations may be omitted or simplified.

Moreover, in the following embodiments, a Z-axis direction corresponds to, for example, the vertical direction, and a positive Z-axis direction may be described as upward, whereas a negative Z-axis direction may be described as downward. Moreover, a Y-axis direction and an X-axis direction are orthogonal to each other on a plane perpendicular to a Z-axis (horizontal plane). Moreover, the Y-axis direction may be described as the lateral direction of a mobile body (first support). Moreover, a positive X-axis direction may be described as a direction in which the mobile body travels (forward in the direction of travel), whereas a negative X-axis direction may be described as the opposite direction to the direction in which the mobile body travels (backward in the direction of travel).

Moreover, in the following embodiments, for example, expressions indicating directions such as "horizontal direction" may be used. In this case, "horizontal direction" means not only that the direction is completely horizontal but also that the direction includes an error of a few percent caused during production or placement.

Moreover, cross-sectional views illustrated in FIGS. 5 to 12, 14 to 19, and 21 described below are diagrams illustrating cross sections corresponding to FIG. 3.

Embodiment 1

[Configuration]

Figure 1:
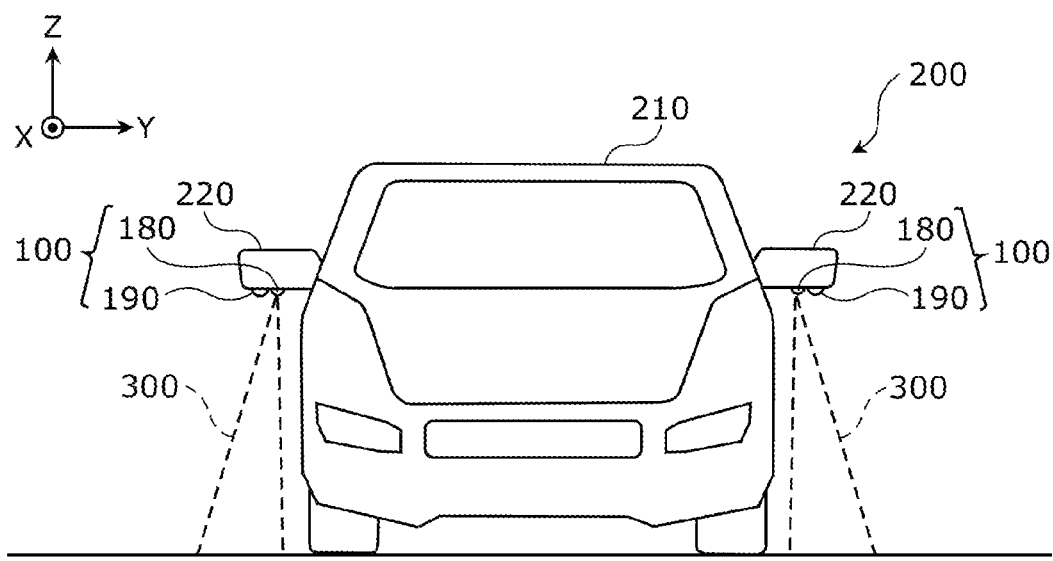
FIG. 1 is a front view of a mobile body according to Embodiment 1.
Figure 2:
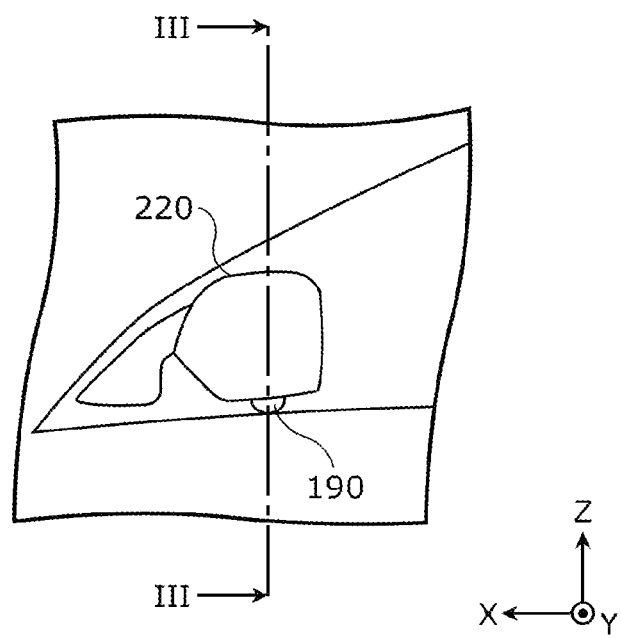
FIG. 2 is an enlarged side view of a side mirror included in the mobile body according to Embodiment 1.

FIG. 1 is a front view of mobile body 200 according to Embodiment 1. FIG. 2 is an enlarged side view of side mirror 220 included in mobile body 200 according to Embodiment 1.

Mobile body 200 is a mobile body, such as an automobile or a motorcycle, including light source units 100. In this embodiment, mobile body 200 is a vehicle (more specifically, automobile). Light source units 100 are disposed, for example, on outer surfaces of mobile body 200. Specifically, light source units 100 are disposed on mobile body 200 at positions, for example, that are adjacent to the outer surfaces facing horizontal directions, including the longitudinal direction and the lateral direction of body portion (first support) 210, and where road surfaces around mobile body 200 can be exposed to light 300 when light emitting apparatuses 180 included in light source units 100 emit light 300 downward.

Note that the outer surfaces refer to not only outside surfaces of body portion 210 of mobile body 200 including outer surfaces facing the horizontal directions, such as forward, backward, to the left, and to the right, but also outer surfaces located on the sides of body portion 210, for example, side surfaces of side mirrors (second supports) 220, bottom surfaces of side mirrors 220, or outside surfaces of doors included in mobile body 200. Moreover, the sentence "mobile body 200 includes light source units 100 on the outer surfaces" includes not only a case where light source units 100 are disposed on the outer surfaces but also a case where light source units 100 are disposed adjacent to the outer surfaces inside mobile body 200.

Mobile body 200 includes body portion 210, side mirrors 220, and light source units 100.

Body portion 210 is a support that supports side mirrors 220, and is a vehicle body into which a driver gets to drive. Body portion 210 supports side mirrors 220 on both sides of body portion 210.

Side mirrors 220 are supports that support light source units 100, and are mirrors attached on the sides of body portion 210. Side mirrors 220 are supported by body portion 210 on the sides of body portion 210 and extend laterally from body portion 210. Side mirrors 220 support light source units 100.

Note that, in FIG. 1, mobile body 200 includes light source units 100 at respective side mirrors 220 located on both sides (both sides along a Y-axis) of body portion 210 but may include light source unit 100 at only one of side mirrors 220.

Light emitting apparatuses 180 are supported by the second supports supported by the first support laterally relative to the first support alongside imaging apparatuses 190, and emit light 300 to be detected by imaging apparatuses 190. In this embodiment, the first support is body portion 210, and the second supports are side mirrors 220. Light source units 100 are attached to side mirrors 220 and image road surfaces by emitting light 300 to the road surfaces and by detecting reflected light resulting from emitted light 300 reflected from the road surfaces. In this embodiment, light source units 100 are disposed in lower parts of side mirrors 220.

Figure 3:
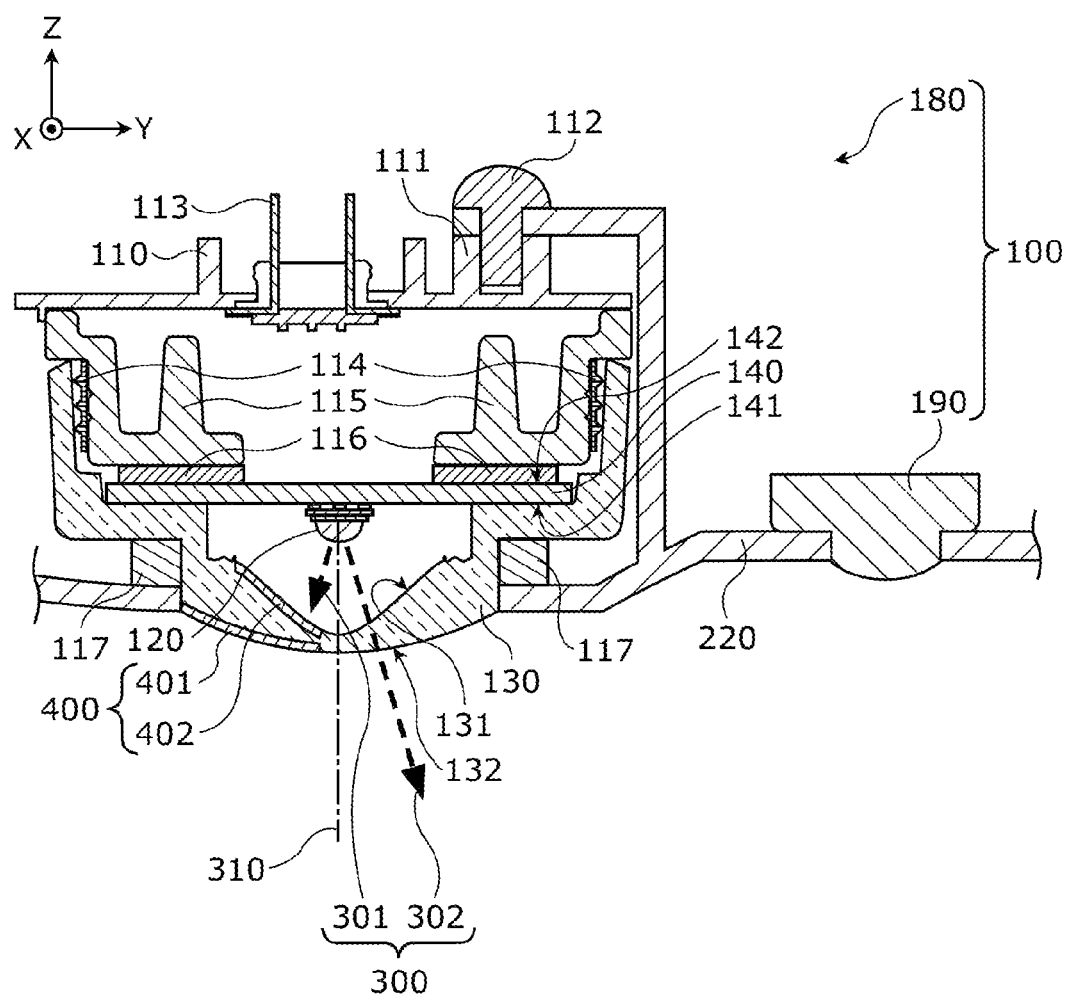
FIG. 3 is a cross-sectional view, taken along line III-III in FIG. 2, of a light source unit according to Embodiment 1.

FIG. 3 is a cross-sectional view, taken along line III-III in FIG. 2, of light source unit 100 according to Embodiment 1.

Light source unit 100 includes light emitting apparatus 180 and imaging apparatus 190.

Light emitting apparatus 180 emits light 300 to be detected by imaging apparatus 190. Specifically, light emitting apparatus 180 is attached to side mirror 220 to emit light 300 to a road surface (downward). Light 300 emitted from light emitting apparatus 180 is, for example, near-infrared light (for example, light with wavelengths of about 700 nm to 2,500 nm), and is emitted so that a road surface around mobile body 200 is imaged by imaging apparatus 190 that is a camera capable of imaging using near-infrared light.

Light emitting apparatus 180 includes lid 110, terminal 113, packing 114, heat sink 115, radiating sheet 116, light source 120, lens 130, and substrate 140.

Lid 110 is a cover for attaching light emitting apparatus 180 to side mirror 220. Lid 110 includes attachment portion 111. Attachment portion 111 has, for example, a screw hole for screw 112. Light emitting apparatus 180 is attached to side mirror 220 by screw 112 screwed into attachment portion 111. Lid 110 is made of, but not limited in particular to, a resin material, such as PBT (PolyButyleneterephtalate) or polycarbonate, or a metal material, for example.

Terminal 113 is used to supply power from an external power source or the like (not illustrated) to light source 120. Terminal 113 and light source 120 are electrically connected by metal wires or the like (not illustrated).

Heat sink 115 is a radiating member for dissipating heat generated at light source 120 disposed on main surface 141 of substrate 140. Heat sink 115 is disposed adjacent to rear surface 142, which is the opposite surface of main surface 141. In this embodiment, heat sink 115 is supported by lid 110. Heat sink 115 is made of, for example, a metal with high thermal conductivity, such as aluminum, stainless steel, or the like. Substrate 140 is placed on heat sink 115 with radiating sheet 116 in between.

Radiating sheet 116 is a sheet-like member that facilitates dissipation of heat generated at light source 120 from substrate 140 to heat sink 115. Radiating sheet 116 is made of, but not limited in particular to, a resin material or the like, for example. Moreover, radiating sheet 116 may be electrically insulating.

Substrate 140 is a substrate on which light source 120 is placed. Substrate 140 is in contact with lens 130 at main surface 141 on which light source 120 is placed. Substrate 140 is, but not limited in particular to, a metal substrate, a ceramic substrate, a resin substrate, or the like, for example. Note that substrate 140 may be a flexible substrate or a rigid substrate.

Light source 120 is an illuminant that emits light 300. Light source 120 emits, for example, light 300 that is near-infrared light. Light source 120 includes, for example, a solid-state semiconductor light source, such as an LED (Light Emitting Diode).

Lens 130 is an optical member on which light 300 emitted from light source 120 is incident and that transmits incident light 300. Specifically, lens 130 is a projection lens that is disposed to cover the lower side of light source 120, on which light 300 emitted from light source 120 is incident, and that controls distribution of incident light 300 to transmit the light to a road surface. In this embodiment, lens 130 has an open-top bowl shape protruding downward. Light source 120 and substrate 140 are accommodated in lens 130. An upper part of lens 130 is closed by lid 110. Lens 130 (more specifically, the base of lens 130) is made of, for example, a light-transmitting glass material or a transparent resin material, such as acrylic or polycarbonate.

Note that lens 130 has a convex shape protruding downward in this embodiment. However, the shape is not limited in particular, and lens 130 may have a planar shape, for example.

Lens 130 includes a part provided with dimmer 400 that at least partially reduces light 300 to be emitted to a side adjacent to body portion 210 (in a negative Y-axis direction in FIG. 3) out of light 300 incident on lens 130. The phrase "the side adjacent to body portion 210" refers to, for example, a part of lens 130 closer to body portion 210 when lens 130, viewed from above, is divided into two equal parts by a line parallel to the longitudinal direction of mobile body 200 (in this embodiment, a direction parallel to an X-axis). Alternatively, for example, dimmer 400 is provided for a part of lens 130 located adjacent to body portion 210 when mobile body 200 is viewed from the front. In this embodiment, in a sectional view illustrated in FIG. 3, dimmer 400 is provided for a part located closer to body portion 210 than optical axis 310 (indicated by a dashed-dotted line in FIG. 3) of light 300 emitted from light source 120 is. This allows dimmer 400 to reduce light 301 traveling to body portion 210 out of light 300 emitted from light source 120. Accordingly, dimmer 400 reduces light 301 traveling to body portion 210 out of light 300 incident on lens 130 when transmitting light 301.

In contrast, light 302 traveling away from body portion 210 out of light 300 emitted from light source 120 is transmitted through lens 130 without being reduced. Accordingly, lens 130 reduces light 301 to be emitted to body portion 210 out of light 300 incident on lens 130 using dimmer 400, and does not reduce light 302 to be emitted away from body portion 210.

Dimmer 400 is a part of lens 130 and reduces light 300. For example, dimmer 400 has a structure formed by texturing, vapor deposition, two-component injection molding, insert molding, or laser radiation. In other words, lens 130 includes the part provided with dimmer 400 that is a structure formed by texturing, vapor deposition, two-component injection molding, insert molding, or laser radiation.

For example, lens 130 is subjected to texturing to obtain projections and recesses on a surface (at least one of inner surface 131 or outer surface 132) thereof, thereby obtaining dimmer 400. This allows dimmer 400 to reduce light 300 by diffusing light 300.

Note that the phrase "to reduce light" means, for example, to reduce the amount of light (for example, light energy, luminous flux, or the like) per unit area when light 300 is transmitted through lens 130 compared with a case where dimmer 400 is not provided. That is, dimmer 400 has a lower transmittance of light 300 compared with parts of lens 130 other than dimmer 400.

Moreover, for example, lens 130 is subjected to vapor deposition to obtain a thin film such as a metal film on the surface (at least one of inner surface 131 or outer surface 132) thereof, thereby obtaining dimmer 400. This allows dimmer 400 to reduce light 300 by absorbing or reflecting light 300.

Moreover, for example, lens 130 is subjected to two-component injection molding to obtain a part that absorbs, reflects, or diffuses light 300 on the surface (at least one of inner surface 131 or outer surface 132) thereof or inside lens 130, thereby obtaining dimmer 400. This allows dimmer 400 to reduce light 300 by absorbing, reflecting, or diffusing light 300.

Moreover, for example, lens 130 is subjected to laser radiation to obtain a colored part that absorbs light 300 on the surface (at least one of inner surface 131 or outer surface 132) thereof or inside lens 130, thereby obtaining dimmer 400. This allows dimmer 400 to reduce light 300 by absorbing light 300. Alternatively, for example, lens 130 is subjected to laser radiation so that the surface (at least one of inner surface 131 or outer surface 132) thereof is roughened, thereby obtaining dimmer 400. This allows dimmer 400 to reduce light 300 by dispersing light 300.

In these manners, dimmer 400 reduces light 300 transmitted through lens 130 by, for example, absorbing, reflecting, or diffusing light 300 incident on lens 130.

Figure 4A:
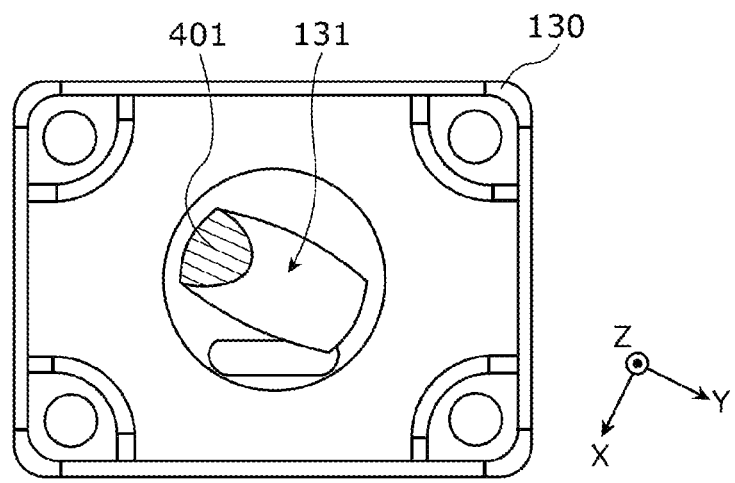
FIG. 4A is a diagram illustrating a lens according to Embodiment 1 viewed from the inner surface side.
Figure 4B:
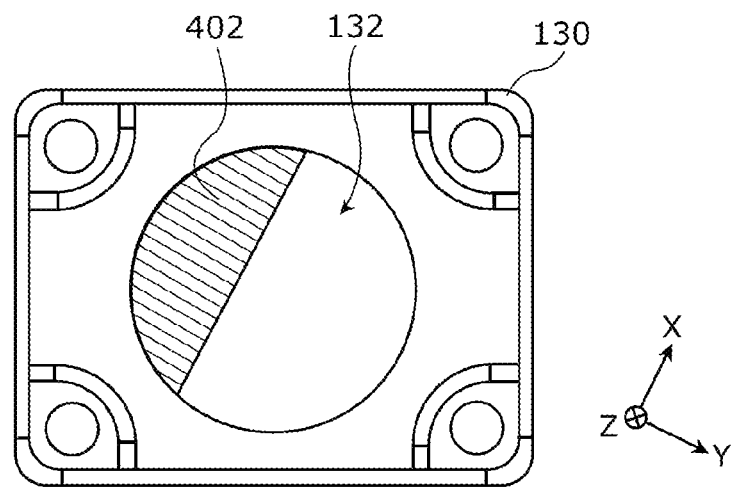
FIG. 4B is a diagram illustrating the lens according to Embodiment 1 viewed from the outer surface side.

FIG. 4A is a diagram illustrating lens 130 according to Embodiment 1 viewed from a side where inner surface 131 lies. FIG. 4B is a diagram illustrating lens 130 according to Embodiment 1 viewed from a side where outer surface 132 lies.

Dimmer 400 is provided on, for example, a surface (inner surface 131) of lens 130 facing light source 120. Alternatively, for example, dimmer 400 is provided on a surface (outer surface 132) of lens 130 opposite to the surface facing light source 120. In this embodiment, inside dimmer 401 that is a part of dimmer 400 is provided on inner surface 131, and outside dimmer 402 that is a part of dimmer 400 is provided on outer surface 132.

Note that dimmer 400 may include only inside dimmer 401 or outside dimmer 402 out of inside dimmer 401 and outside dimmer 402, or may include both.

Moreover, FIG. 3 illustrates an example where dimmer 400 is provided in the vicinity of inner surface 131 and outer surface 132 of lens 130. However, dimmer 400 may be provided inside lens 130.

For example, shock absorber 117 that is an elastic member, such as sponge, is disposed between side mirror 220 and lens 130.

Packing 114 is a shock absorber disposed between lens 130 and heat sink 115. Packing 114 is made of, for example, an elastic resin material, such as rubber.

Imaging apparatus 190 is a camera that detects light 300 emitted from light emitting apparatus 180. Specifically, imaging apparatus 190 is attached to side mirror 220 to be able to detect reflected light resulting from light 300 reflected from a road surface. Imaging apparatus 190 detects light 300 reflected from the road surface around mobile body 200 to create images of the road surface. As described above, light source 120 is, for example, a near-infrared light source that emits near-infrared light (that is, light 300 is near-infrared light), and imaging apparatus 190 detects the near-infrared light emitted from light emitting apparatus 180, specifically, the near-infrared light emitted from light source 120 and reflected from the road surface.

For example, imaging apparatus 190 includes an imaging device, such as a CCD (Charge Coupled Device) image sensor, a CMOS (Complementary Metal Oxide Semiconductor) image sensor, or the like, for detecting light 300.

Moreover, in this embodiment, body portion 210, light emitting apparatus 180, and imaging apparatus 190 are arranged in stated order. Body portion 210, light emitting apparatus 190, and imaging apparatus 180 may also be arranged in stated order.

Moreover, imaging apparatus 190 may be located at a position away from light emitting apparatus 180 in the opposite direction to that in which light emitting apparatus 180 emits light 300 (in this embodiment, downward and in a negative Z-axis direction). In this embodiment, imaging apparatus 190 is located above light emitting apparatus 180.

According to this, light 300 emitted from light emitting apparatus 180 is prevented from being directly incident on imaging apparatus 190 without being reflected from the road surface.

[Effects and the Like]

As described above, light emitting apparatus 180 according to Embodiment 1 is supported by side mirror 220 supported by body portion 210 laterally relative to body portion 210 alongside imaging apparatus 190, and emits light 300 to be detected by imaging apparatus 190. Light emitting apparatus 180 includes light source 120 that emits light 300 and lens 130 on which light 300 emitted from light source 120 is incident and that transmits incident light 300. Lens 130 includes the part provided with dimmer 400 that at least partially reduces light 300 to be emitted to body portion 210 out of light 300 incident on lens 130.

As a result of extensive research, the inventors found that, when light, out of light 300 emitted from light emitting apparatus 180, once reflected from body portion 210 is incident on imaging apparatus 190, the light causes halation. To prevent this, light emitting apparatus 180 at least partially reduces light traveling to body portion 210 out of light 300 incident on lens 130 using dimmer 400 when emitting the light. According to this, the amount of light 300 reflected from body portion 210 can be reduced. Accordingly, light emitting apparatus 180 can prevent halation from appearing in images created by imaging apparatus 190.

Moreover, for example, dimmer 400 is provided on the surface (inner surface 131) of lens 130 facing light source 120.

Alternatively, for example, dimmer 400 is provided on the surface (outer surface 132) of lens 130 opposite to the surface (inner surface 131) facing light source 120.

According to the above, the structure can be simplified compared with a case where light emitting apparatus 180 includes a separate structure for reducing light 300.

Moreover, for example, dimmer 400 is provided for the part of lens 130 by texturing, vapor deposition, two-component injection molding, insert molding, or laser radiation.

According to this, dimmer 400 can be formed easily in lens 130.

Moreover, for example, dimmer 400 reduces light transmitted through lens 130 by absorbing, reflecting, or diffusing light 300 incident on lens 130.

According to this, dimmer 400 can reduce the amount of light, per unit area, traveling to body portion 210.

Moreover, light source 120 emits, for example, light 300 that is near-infrared light.

In the case where light 300 is near-infrared light, it is hard for users to visually identify light 300. Accordingly, for example, a member that prevents reflection cannot be easily placed at an appropriate position on body portion 210 or the like exposed to light 300 because the position exposed to light 300 is unidentifiable. To solve this, light emitting apparatus 180 is provided with the configuration that reduces the light traveling to body portion 210. This can prevent halation even in the case where light 300 is hard to be visually identified. That is, light emitting apparatus 180 is particularly suitable for the case where light 300 is near-infrared light.

Moreover, light source unit 100 according to Embodiment 1 includes light emitting apparatus 180 and imaging apparatus 190.

According to this, light emitting apparatus 180 can reduce the amount of light 300 reflected from body portion 210, preventing halation from appearing in the images created by imaging apparatus 190.

Moreover, mobile body 200 according to Embodiment 1 includes light source units 100, body portion 210 that is the first support described above, and side mirrors 220 that are the second supports described above. Light emitting apparatuses 180 are attached to side mirrors 220 to emit light 300 to the road surfaces. Imaging apparatuses 190 detect light 300 reflected from the road surfaces to create images of the road surfaces.

According to this, mobile body 200 can create images, with little or no halation, of the road surfaces around mobile body 200 using light source units 100.

[Variation]

Next, a variation of Embodiment 1 will be described. In the description of the variation of Embodiment 1, differences from Embodiment 1 will be mainly described. Configurations substantially similar to those described in Embodiment 1 are given similar reference signs, and descriptions thereof may be partially simplified or omitted.

Figure 5:
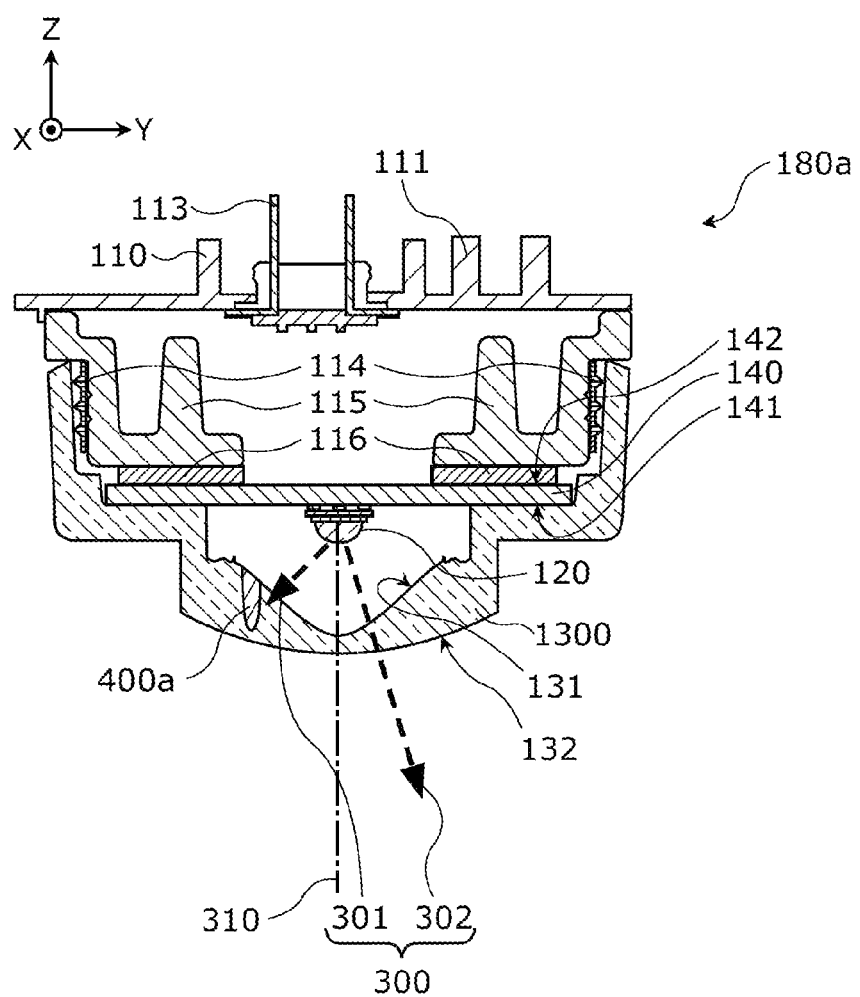
FIG. 5 is a cross-sectional view of a light emitting apparatus according to a variation of Embodiment 1.

FIG. 5 is a cross-sectional view of light emitting apparatus 180*a* according to the variation of Embodiment 1.

The mobile body and the light source unit according to the variation of Embodiment 1 are the same as those according to Embodiment 1 except for the configuration of the light emitting apparatus. For example, light emitting apparatus 180*a* is supported by the second support supported by the first support laterally relative to the first support alongside imaging apparatus 190, and emits light to be detected by imaging apparatus 190.

Light emitting apparatus 180*a* emits light 300 downward (to a road surface).

Light emitting apparatus 180*a* includes lid 110, terminal 113, packing 114, heat sink 115, radiating sheet 116, light source 120, lens 1300, substrate 140, and dimmer 400*a*.

Lens 1300 is an optical member on which light 300 emitted from light source 120 is incident and that transmits incident light 300.

Lens 1300 includes a part provided with dimmer 400*a* that at least partially reduces light 300 (for example, light 301 illustrated in FIG. 5) to be emitted to body portion 210 (in the negative Y-axis direction in FIG. 5) out of light 300 incident on lens 1300.

Dimmer 400*a* is a part of lens 1300 and reduces light 300. For example, dimmer 400*a* reduces light transmitted through lens 1300 by absorbing, reflecting, or diffusing light 300 incident on lens 1300. In this variation, lens 1300 provided with dimmer 400*a* is produced by forming dimmer 400*a* made of a metal material or the like in a hollow (recess) in inner surface 131 of the base of lens 1300 made of a glass material, a resin material, or the like (that is, by insert molding).

In this manner, lens 1300 may include the base of lens 1300 with inner surface 131 having a recess and dimmer 400*a* injected into the recess and integral to the base. Note that lens 1300 may be produced by forming dimmer 400*a* in the recess using a material mainly composed of the same material as the base of lens 1300.

Embodiment 2

Next, Embodiment 2 will be described. In the description of Embodiment 2, differences from Embodiment 1 will be mainly described. Configurations substantially similar to those described in Embodiment 1 are given similar reference signs, and descriptions thereof may be partially simplified or omitted.

[Configuration]

Figure 6:
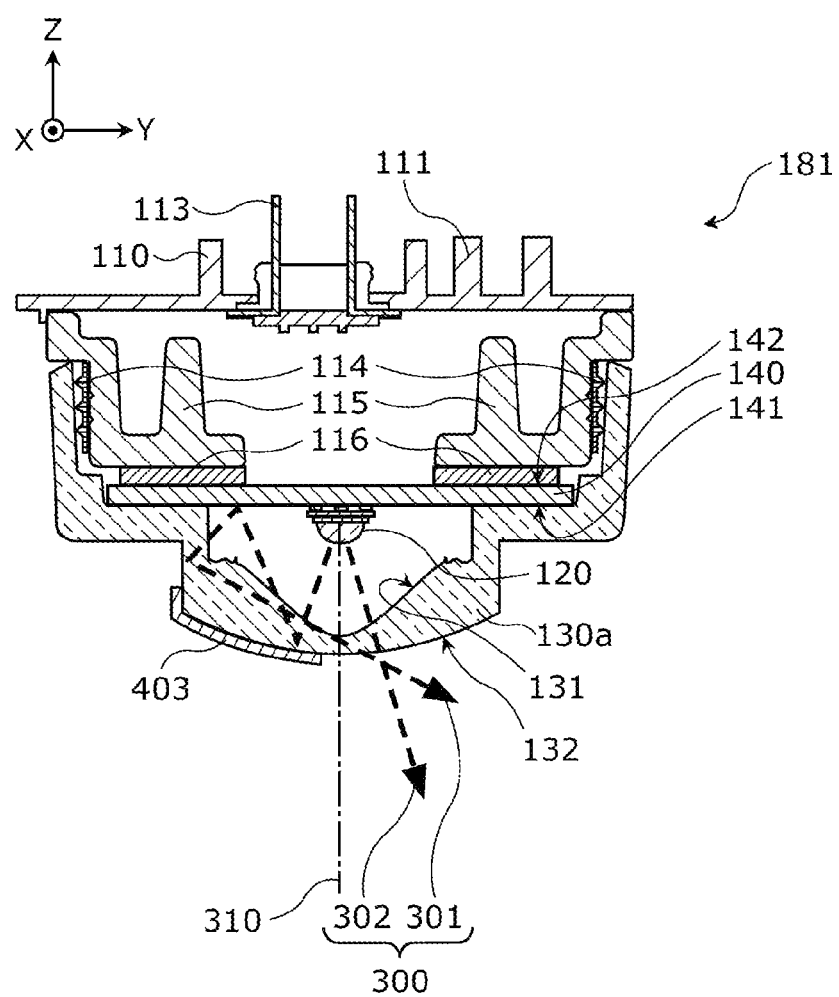
FIG. 6 is a cross-sectional view of a light emitting apparatus according to Embodiment 2.

FIG. 6 is a cross-sectional view of light emitting apparatus 181 according to Embodiment 2.

The mobile body and the light source unit according to Embodiment 2 are the same as those according to Embodiment 1 except for the configuration of the light emitting apparatus. For example, light emitting apparatus 181 is supported by the second support supported by the first support laterally relative to the first support alongside imaging apparatus 190, and emits light to be detected by imaging apparatus 190.

Light emitting apparatus 181 emits light 300 downward (to a road surface).

Light emitting apparatus 181 includes lid 110, terminal 113, packing 114, heat sink 115, radiating sheet 116, light source 120, lens 130*a*, substrate 140, and dimmer 403.

Lens 130*a* is an optical member on which light 300 emitted from light source 120 is incident and that transmits incident light 300. Specifically, lens 130*a* is a projection lens that is disposed to cover the lower side of light source 120, on which light 300 emitted from light source 120 is incident, and that controls distribution of incident light 300 to transmit the light to a road surface. Lens 130*a* is made of, for example, a light-transmitting glass material or a transparent resin material, such as acrylic or polycarbonate.

Here, unlike lens 130, lens 130*a* is not provided with dimmer 400. Accordingly, the transmittance of light 300 does not vary depending on the position in lens 130*a*.

Moreover, dimmer 403 is placed on outer surface 132 of lens 130*a*.

Dimmer 403 is a member that at least partially reflects or diffuses light 301 traveling to body portion 210 out of light 300 transmitted through lens 130*a*. Specifically, dimmer 403 at least partially reflects or diffuses light 301 transmitted through outer surface 132 in a direction from inner surface 131 to outer surface 132 of lens 130*a*. In this embodiment, dimmer 403 has reflectivity of light 300.

For example, dimmer 403 is provided for a part of lens 130*a* located adjacent to body portion 210 when mobile body 200 is viewed from the front. Dimmer 403 is disposed to cover a lower part of lens 130*a* located adjacent to body portion 210. For example, dimmer 403 is disposed to be in contact with outer surface 132 of lens 130*a* opposite to the surface facing light source 120. In this embodiment, dimmer 403 is provided for a part of lens 130*a* located on the outer side (lower side) opposite a side where light source 120 lies and, in a sectional view illustrated in FIG. 6, located closer to body portion 210 than optical axis 310 (indicated by a dashed-dotted line in FIG. 6) of light 300 emitted from light source 120 is. This allows dimmer 403 to reduce the light traveling to body portion 210 out of light 300 emitted from light source 120.

For example, out of light 300 emitted from light source 120, light 301 traveling to body portion 210 is transmitted through lens 130*a* and reflected from dimmer 403 (more specifically, from the interface between dimmer 403 and lens 130*a*). Light 301 is further reflected repeatedly between substrate 140 and lens 130*a* and then transmitted through lens 130*a* away from body portion 210.

This allows dimmer 403 to reduce the light traveling to body portion 210 out of light 300 transmitted through lens 130*a*.

Note that, in this embodiment, dimmer 403 is disposed to be in contact with outer surface 132 of lens 130*a* opposite to the surface facing light source 120. Dimmer 403 need only be located on the outer side of lens 130*a* opposite the side where light source 120 lies, and does not need to be in contact with lens 130*a*.

Moreover, dimmer 403 may cover not only outer surface 132 located on the lower side of lens 130a but also an outer surface located on a side of lens 130a.

Dimmer 403 is made of, for example, a metal material or the like having reflectivity of light 300. Alternatively, dimmer 403 is made of a resin material or the like containing light diffusing agents, such as silica particles or titanium particles, for diffusing light 300. Note that dimmer 403 may have transmissivity of light 300. In this case, dimmer 403 having transmissivity of light 300 need only reduce the amount of light 300 transmitted through dimmer 403 by reflecting or diffusing light 300.

[Effects and the Like]

As described above, light emitting apparatus 181 according to Embodiment 2 is supported by the second support (for example, side mirror 220) supported by the first support (for example, body portion 210) laterally relative to the first support alongside imaging apparatus 190, and emits light 300 to be detected by imaging apparatus 190. Light emitting apparatus 181 includes light source 120 that emits light 300, lens 130a on which light 300 emitted from light source 120 is incident and that transmits incident light 300, and dimmer 403 that at least partially reflects or diffuses light 300 traveling to the first support (in this embodiment, in the negative Y-axis direction) out of light 300 transmitted through lens 130a.

According to this, dimmer 403 can at least partially reduce the light traveling to body portion 210 out of light 300 transmitted through lens 130a. Accordingly, the amount of light 300 reflected from body portion 210 can be reduced. This allows light emitting apparatus 181 to prevent halation from appearing in the images created by imaging apparatus 190. Moreover, dimmer 403 reduces the amount of light 300 traveling to body portion 210 by reflecting or diffusing light 300. For example, in a case where dimmer 403 reduces the amount of light 300 traveling to body portion 210 by absorbing light 300, dimmer 403 generates heat. In contrast, in the case where dimmer 403 reduces the amount of light 300 traveling to body portion 210 by reflecting or diffusing light 300, the amount of heat to be generated can be reduced compared with the case where dimmer 403 reduces the amount of light 300 traveling to body portion 210 by absorbing light 300. Accordingly, a reduction in the amount of light 300 traveling to body portion 210 by dimmer 403 by reflection or diffusion of light 300 can prevent heat generation as well as halation in the images created by imaging apparatus 190.

Moreover, for example, dimmer 403 is disposed to be in contact with the surface (outer surface 132) of lens 130a opposite the surface (more specifically, inner surface 131) facing light source 120.

According to this, compared with a case where a gap is left between lens 130a and dimmer 403, lens 130a and dimmer 403 in contact with each other can prevent light from leaking to body portion 210 through the gap. This further prevents halation. Moreover, even when heat is generated at dimmer 403, lens 130a and dimmer 403 in contact with each other allow the heat to be dissipated to heat sink 115 or the like through lens 130a. Accordingly, the configuration described above can improve heat dissipation characteristics of light emitting apparatus 181.

Embodiment 3

Next, Embodiment 3 will be described. In the description of Embodiment 3, differences from Embodiments 1 and 2 will be mainly described. Configurations substantially similar to those described in Embodiments 1 and 2 are given similar reference signs, and descriptions thereof may be partially simplified or omitted.

[Configuration]

Figure 7:
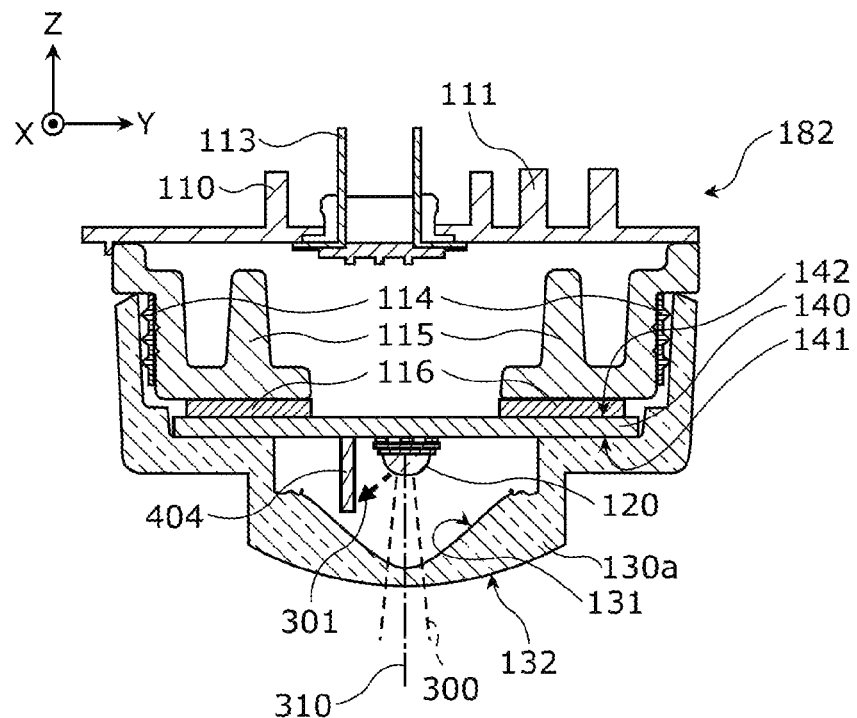
FIG. 7 is a cross-sectional view of a light emitting apparatus according to Embodiment 3.

FIG. 7 is a cross-sectional view of light emitting apparatus 182 according to Embodiment 3.

The mobile body and the light source unit according to Embodiment 3 are the same as those according to Embodiment 1 except for the configuration of the light emitting apparatus. For example, light emitting apparatus 182 is supported by the second support supported by the first support laterally relative to the first support alongside imaging apparatus 190, and emits light to be detected by imaging apparatus 190.

Light emitting apparatus 182 emits light 300 downward (to a road surface).

Light emitting apparatus 182 includes lid 110, terminal 113, packing 114, heat sink 115, radiating sheet 116, light source 120, lens 130a, substrate 140, and screen 404.

Screen 404 is a member disposed between light source 120 and lens 130a to at least partially absorb, reflect, or diffuse light 301 traveling to a part of lens 130a located adjacent to body portion 210 out of light 300 emitted from light source 120. For example, in a sectional view illustrated in FIG. 7, screen 404 is disposed at a position closer to body portion 210 than optical axis 310 (indicated by a dashed-dotted line in FIG. 7) of light 300 emitted from light source 120 is.

Accordingly, in light emitting apparatus 182, out of light 300 emitted from light source 120, the amount of light traveling to the part of lens 130a located adjacent to body portion 210 is less than the amount of light traveling to a part of lens 130a located away from body portion 210. In this embodiment, light emitting apparatus 182 is configured such that screen 404 reduces the amount of light traveling to the part of lens 130a located adjacent to body portion 210 out of light 300 emitted from light source 120 compared with the amount of light traveling to the part of lens 130a located away from body portion 210.

Screen 404 need only be composed of a member that at least partially absorbs, reflects, or diffuses light 301 traveling to the part of lens 130a located adjacent to body portion 210, and the member is not limited in particular.

Screen 404 is made of, for example, a metal material or the like having reflectivity of light 300. Alternatively, screen 404 is made of a resin material or the like containing light diffusing agents, such as silica particles or titanium particles, for diffusing light 300. Alternatively, screen 404 is made of a resin material or the like containing light absorbents, such as coloring matters, that absorb light 300.

Note that screen 404 may have transmissivity of light 300. In a case where screen 404 is made of a material having transmissivity of light 300, screen 404 need only be configured to reduce the amount of light 300 transmitted through screen 404 by, for example, diffusing light 300.

Moreover, the shape of screen 404 is not limited in particular. For example, screen 404 may be flat or semi-cylindrical.

In this embodiment, screen 404 is an electronic component disposed on substrate 140. Specifically, screen 404 is an electronic component disposed (mounted) on main surface 141 of substrate 140, main surface 141 being the surface where light source 120 is placed (mounted). The type of the electronic component is not limited in particular. For example, the electronic component may be a tall component, such as a capacitor, a component with leads, or the like.

Moreover, the height of screen 404 from main surface 141 of substrate 140 is greater than that of light source 120, for example. According to this, screen 404 can reflect, absorb, or diffuse most of light 301 emitted from light source 120 to lens 130a in a direction from light source 120 to body portion 210, out of light 300 emitted from light source 120.

Note that screen 404 may be disposed to cover the lower side of light source 120.

[Effects and the Like]

As described above, light emitting apparatus 182 according to Embodiment 3 is supported by the second support (for example, side mirror 220) supported by the first support (for example, body portion 210) laterally relative to the first support alongside imaging apparatus 190, and emits light 300 to be used for imaging by imaging apparatus 190. Light emitting apparatus 182 includes light source 120 that emits light 300 and lens 130a on which light 300 emitted from light source 120 is incident and that transmits incident light 300. Out of light 300 emitted from light source 120, the amount of light traveling to a part of lens 130a located adjacent to the first support (in this embodiment, in the negative Y-axis direction) is less than the amount of light traveling to a part of lens 130a located away from the first support.

According to this, the light traveling to body portion 210 out of light 300 incident on lens 130a can be at least partially reduced. Accordingly, the amount of light 300 reflected from body portion 210 can be reduced. This allows light emitting apparatus 182 to prevent halation from appearing in the images created by imaging apparatus 190.

Moreover, for example, light emitting apparatus 182 further includes screen 404 disposed between light source 120 and lens 130a. Screen 404 at least partially absorbs, reflects, or diffuses the light traveling to the part of lens 130a located adjacent to body portion 210 out of light 300 emitted from light source 120.

According to this, screen 404 can at least partially reduce the light traveling to body portion 210 out of light 300 transmitted through lens 130a. Accordingly, the amount of light 300 reflected from body portion 210 can be reduced. This allows light emitting apparatus 182 to prevent halation from appearing in the images created by imaging apparatus 190.

Moreover, for example, light emitting apparatus 182 further includes substrate 140 on which light source 120 is placed. Screen 404 is an electronic component disposed on substrate 140.

Multiple electronic components are mounted on substrate 140 to, for example, supply power appropriately to light source 120. The electronic components of this type include tall components. Accordingly, an electronic component placed on substrate 140 is used as screen 404. According to this, the light traveling to body portion 210 out of light 300 transmitted through lens 130a can be at least partially reduced easily without any additional element only by setting the layout of the electronic components on substrate 140 appropriately.

[Variations]

Next, variations of Embodiment 3 will be described. In the descriptions of the variations of Embodiment 3, differences from Embodiment 3 and the variations will be mainly described. Configurations substantially similar to those described in Embodiment 3 and the variations are given similar reference signs, and descriptions thereof may be partially simplified or omitted.

<Variation 1>

Figure 8:
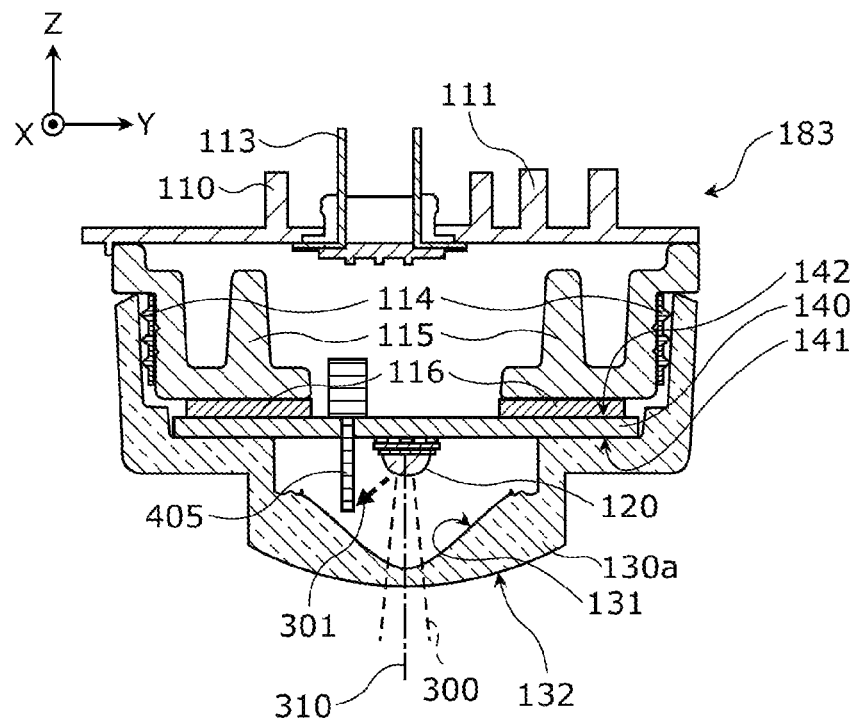
FIG. 8 is a cross-sectional view of a light emitting apparatus according to Variation 1 of Embodiment 3.

FIG. 8 is a cross-sectional view of light emitting apparatus 183 according to Variation 1 of Embodiment 3.

Light emitting apparatus 183 includes lid 110, terminal 113, packing 114, heat sink 115, radiating sheet 116, light source 120, lens 130a, substrate 140, and screen 405.

Screen 405 is a member disposed between light source 120 and lens 130a to at least partially absorb, reflect, or diffuse light 301 traveling to the part of lens 130a located adjacent to body portion 210 out of light 300 emitted from light source 120.

Screen 405 passes through substrate 140 to be disposed on substrate 140. Specifically, screen 405 is an electronic component including a pin passing through main surface 141 and rear surface 142 of substrate 140. In this manner, screen 405 need only include a part disposed between light source 120 and lens 130a to at least partially absorb, reflect, or diffuse light 301 traveling to the part of lens 130a located adjacent to body portion 210 out of light 300 emitted from light source 120.

In this variation, screen 405 is a connector electrically connected to terminal 113 by wires or the like (not illustrated). Light source 120 is supplied with power from an external power source or the like (not illustrated) through screen 405 that is the connector.

In this manner, the type of the electronic component that is the screen included in the light emitting apparatus according to the present invention is not limited in particular.

Moreover, the pin of screen 405 (part located on a side where main surface 141 of substrate 140 lies illustrated in FIG. 8) may be covered with, for example, a cover member of resin or the like that blocks light 300. This allows the cover member to at least partially reduce light 301 traveling to the part of lens 130a located adjacent to body portion 210 even in a case where the pin is thin, for example.

<Variation 2>

Figure 9:
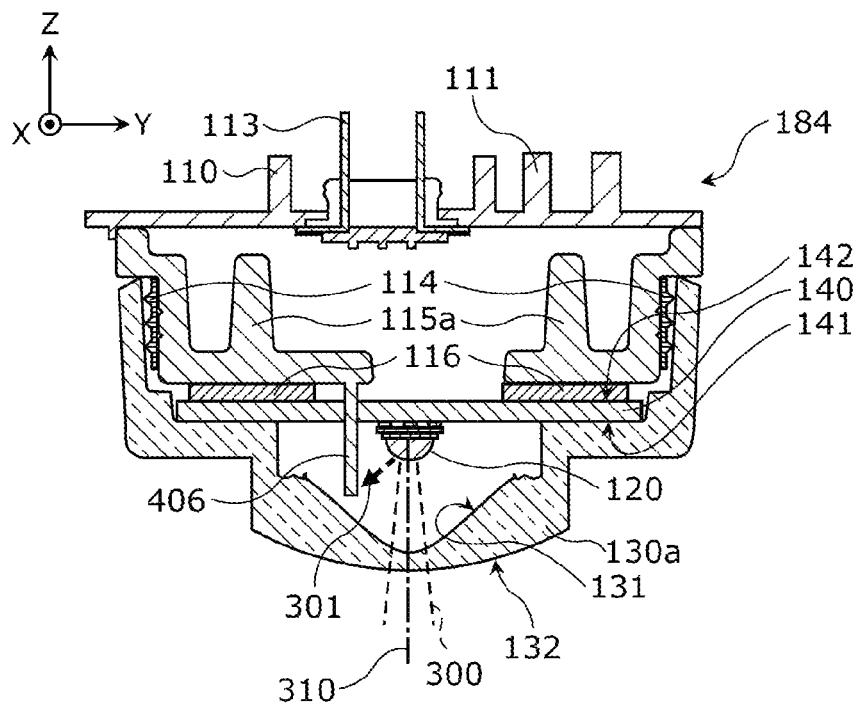
FIG. 9 is a cross-sectional view of a light emitting apparatus according to Variation 2 of Embodiment 3.

FIG. 9 is a cross-sectional view of light emitting apparatus 184 according to Variation 2 of Embodiment 3.

Light emitting apparatus 184 includes lid 110, terminal 113, packing 114, heat sink 115a, radiating sheet 116, light source 120, lens 130a, and substrate 140.

Heat sink 115a is a radiating member for dissipating the heat generated at light source 120 disposed on main surface 141 of substrate 140. Heat sink 115a is disposed adjacent to rear surface 142, which is the opposite surface of main surface 141. In this variation, heat sink 115a is supported by lid 110. Heat sink 115a is made of, for example, a metal with high thermal conductivity, such as aluminum, stainless steel, or the like. Substrate 140 is placed on heat sink 115a with radiating sheet 116 in between.

Moreover, heat sink 115a includes screen 406. In other words, heat sink 115a and screen 406 are integral to each other.

Screen 406 is a member disposed between light source 120 and lens 130a to at least partially absorb, reflect, or diffuse light 301 traveling to the part of lens 130a located adjacent to body portion 210 out of light 300 emitted from light source 120. In this variation, screen 406 passes through substrate 140.

Note that screen 406 has a pin shape in this variation, but the shape is not limited in particular.

As described above, light emitting apparatus 184 according to Variation 2 includes light source 120, lens 130a, substrate 140 on which light source 120 is placed, and heat sink 115a on which substrate 140 is placed. Screen 406 is a part of heat sink 115a and passes through substrate 140 to be disposed between light source 120 and lens 130a.

This negates the need for adhesives or the like for securing screen 406, simplifying the structure. Moreover, for example, when screen 406 is attached to substrate 140, misalignment of screen 406 from an appropriate position can be prevented.

<Variation 3>

Figure 10:
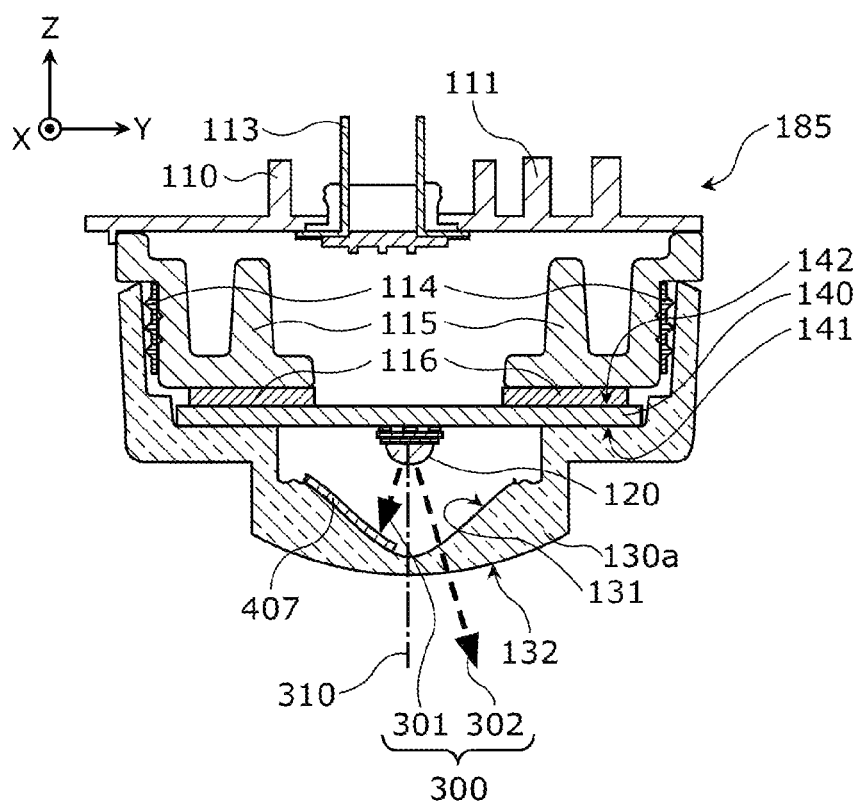
FIG. 10 is a cross-sectional view of a light emitting apparatus according to Variation 3 of Embodiment 3.

FIG. 10 is a cross-sectional view of light emitting apparatus 185 according to Variation 3 of Embodiment 3.

Light emitting apparatus 185 includes lid 110, terminal 113, packing 114, heat sink 115, radiating sheet 116, light source 120, lens 130a, substrate 140, and screen 407.

Screen 407 is a member disposed between light source 120 and lens 130a to at least partially absorb, reflect, or diffuse light 301 traveling to the part of lens 130a located adjacent to body portion 210 out of light 300 emitted from light source 120.

Screen 407 is disposed to be in contact with inner surface 131 of lens 130a. Screen 407 is directly joined to inner surface 131 of lens 130a by heat staking without using adhesives or the like.

In this manner, the position at which screen 407, disposed between light source 120 and lens 130a, is attached to light emitting apparatus 185 is not limited in particular, and may be on, for example, substrate 140, lens 130a, or other members such as heat sink 115.

<Variation 4>

Figure 11:
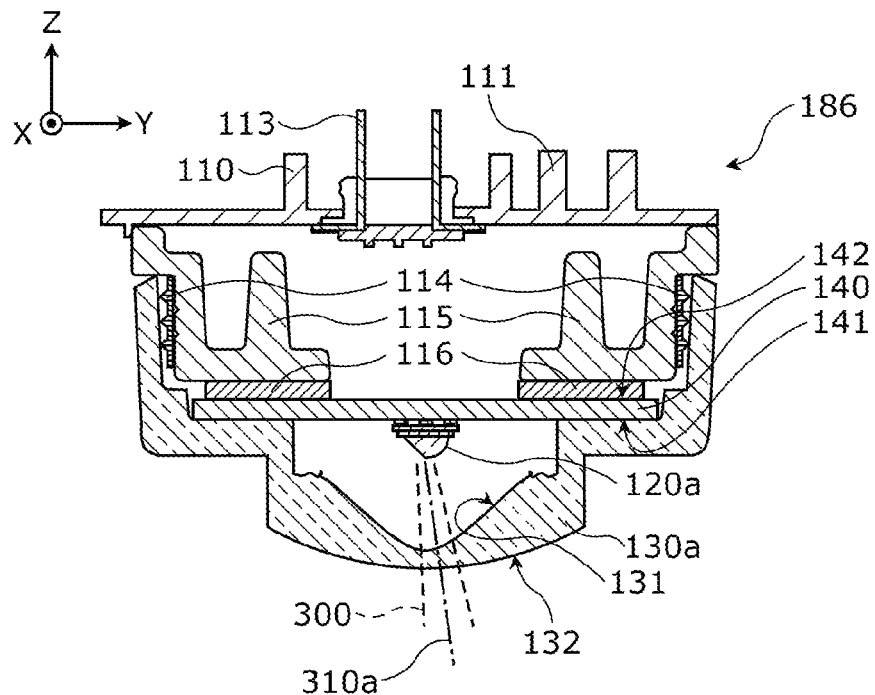
FIG. 11 is a cross-sectional view of a light emitting apparatus according to Variation 4 of Embodiment 3.

FIG. 11 is a cross-sectional view of light emitting apparatus 186 according to Variation 4 of Embodiment 3.

Light emitting apparatus 186 includes lid 110, terminal 113, packing 114, heat sink 115, radiating sheet 116, light source 120a, lens 130a, and substrate 140.

Figure 12:
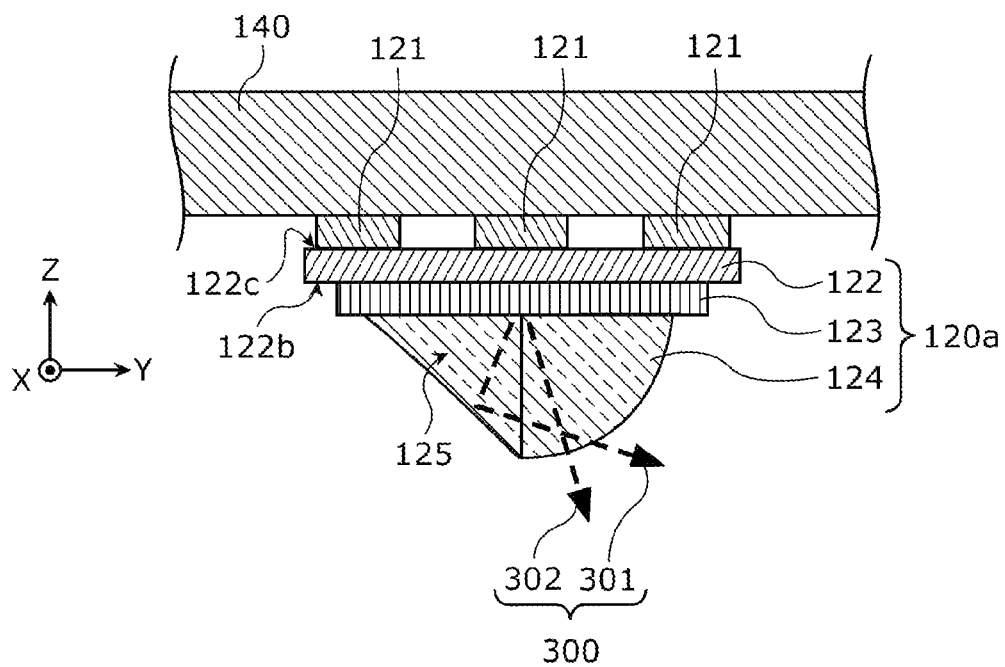
FIG. 12 is a cross-sectional view of a light source according to Variation 4 of Embodiment 3.

FIG. 12 is a cross-sectional view of light source 120a according to Variation 4 of Embodiment 3.

Light source 120a is an illuminant that emits light 300. Light source 120a emits, for example, light 300 that is near-infrared light.

Light source 120a includes mounting substrate 122, light emitter 123, and light emitter lens 124.

Mounting substrate 122 is a substrate on which light emitter 123 that emits light 300 is mounted. Mounting substrate 122 is connected to substrate 140 at connection surface 122c with adhesive portions 121 that are adhesive members such as solder in between, connection surface 122c being the opposite surface of mounting surface 122b on which light emitter 123 is mounted.

Light emitter 123 is an illuminant that emits light 300. Light emitter 123 includes, for example, a solid-state semiconductor light source, such as an LED. Light emitter lens 124 is disposed on light emitter 123 to face a direction in which light emitter 123 emits light 300. In this variation, the optical axis of light 300 emitted from light emitter 123 is parallel to a Z-axis.

Light emitter lens 124 is an optical member on which light 300 emitted from light emitter 123 is incident and that transmits incident light 300. Specifically, light emitter lens 124 is a lens that is disposed to cover a light emission side (in this variation, lower side) of light emitter 123, on which light 300 emitted from light emitter 123 is incident, and that controls distribution of incident light 300 to transmit the light to a road surface. Light emitter lens 124 is made of, for example, a light-transmitting glass material or a transparent resin material, such as silicone, acrylic, or polycarbonate.

Light emitter lens 124 includes inclined surfaces 125 to at least partially reduce light 300 traveling to body portion 210 out of light 300 emitted from light emitter 123. That is, inclined surfaces 125 are flat surfaces formed on light emitter lens 124 and are dimmers that at least partially reduce light 300 traveling to body portion 210.

For example, inclined surfaces 125 are provided for a part of light emitter lens 124 located adjacent to body portion 210 when mobile body 200 is viewed from the front. In this variation, normal lines (normal vectors) to inclined surfaces 125 extend to body portion 210. For example, inclined surfaces 125 are flat surfaces inclined with respect to the optical axis (in this variation, axis parallel to the Z-axis) of light 300 emitted from light emitter 123.

Light 301 traveling to body portion 210 out of light 300 emitted from light emitter 123 is reflected from inclined surfaces 125. Accordingly, at least part of light 301 traveling to body portion 210 out of light 300 emitted from light emitter 123 is transmitted through light emitter lens 124 away from body portion 210.

In contrast, a part of light emitter lens 124 located away from body portion 210 is curved when mobile body 200 is viewed from the front. According to this, light 302 traveling away from body portion 210 is emitted without being reflected. Accordingly, light emitter lens 124 provided with inclined surfaces 125 reduces light 301 traveling to body portion 210 out of light 300 emitted from light emitter 123 using inclined surfaces 125, and does not reduce light 302 traveling away from body portion 210.

This causes light 300 emitted from light source 120a to be emitted away from body portion 210. In other words, optical axis 310a of light 300 emitted from light source 120a is inclined away from body portion 210 with respect to optical axis 310 of light 300 emitted from light source 120 when viewed from light source 120.

Figure 13:
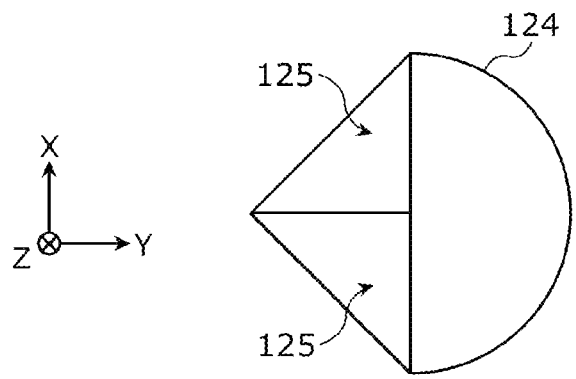
FIG. 13 is a bottom view of a light emitter lens according to Variation 4 of Embodiment 3.

FIG. 13 is a bottom view of light emitter lens 124 according to Variation 4 of Embodiment 3.

For example, two inclined surfaces 125 are provided for the part of light emitter lens 124 located adjacent to body portion 210 when mobile body 200 is viewed from the front. For example, when viewed from below, light emitter lens 124 is substantially triangular at the part located adjacent to body portion 210 and semicircular at the part located away from body portion 210.

Note that the number of inclined surfaces 125 formed on light emitter lens 124 is not limited in particular. The number of inclined surfaces 125 formed on light emitter lens 124 may be one, or three or more.

As described above, light source 120a includes light emitter 123 that emits light 300 and light emitter lens 124 on which light 300 emitted from light emitter 123 is incident and that transmits incident light 300 to a lens (for example, lens 130 illustrated in FIG. 3). Light emitter lens 124 includes flat surfaces (inclined surfaces 125) inclined with respect to the optical axis (in this variation, axis parallel to the Z-axis) of light 300 emitted from light emitter 123 at the part located adjacent to body portion 210.

According to this, light 301 traveling to body portion 210 out of light 300 emitted from light emitter 123 is reflected from inclined surfaces 125. Accordingly, the light traveling to body portion 210 out of light 300 emitted from light emitter 123 is reduced.

<Variation 5>

Figure 14:
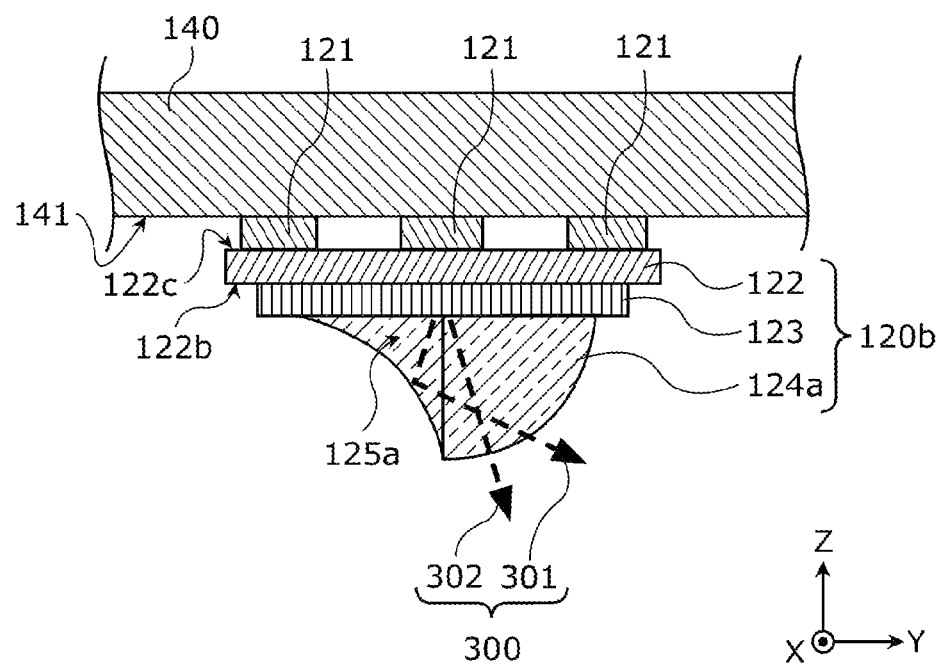
FIG. 14 is a cross-sectional view of a light source according to Variation 5 of Embodiment 3.

FIG. 14 is a cross-sectional view of light source 120b according to Variation 5 of Embodiment 3.

Unlike light source 120a, light source 120b includes light emitter lens 124a provided with curved inclined surface 125a. Specifically, inclined surface 125a is a curved surface protruding toward the light emitter. Although inclined surface 125a is curved, light 301 traveling to body portion 210 out of light 300 emitted from light emitter 123 is reflected from inclined surface 125a. Accordingly, at least part of light 301 traveling to body portion 210 out of light 300 emitted from light emitter 123 is transmitted through light emitter lens 124a away from body portion 210.

Note that the radius of curvature of inclined surface 125a is not limited in particular.

As described above, light source 120b includes light emitter 123 that emits light 300 and light emitter lens 124a on which light 300 emitted from light emitter 123 is incident and that transmits incident light 300 to a lens (for example, lens 130 illustrated in FIG. 3). The surface of light emitter lens 124a located adjacent to body portion 210 is a curved surface protruding toward light emitter 123.

According to this, light 301 traveling to body portion 210 out of light 300 emitted from light emitter 123 is reflected from inclined surface 125a. Accordingly, the light traveling to body portion 210 out of light 300 emitted from light emitter 123 is reduced.

<Variation 6>

Figure 15:
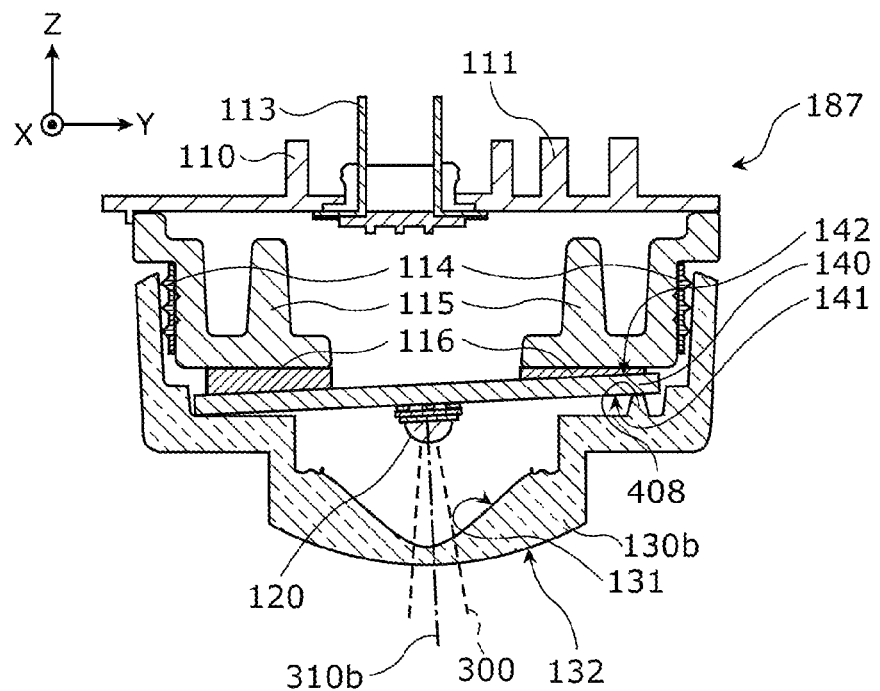
FIG. 15 is a cross-sectional view of a light emitting apparatus according to Variation 6 of Embodiment 3.

FIG. 15 is a cross-sectional view of light emitting apparatus 187 according to Variation 6 of Embodiment 3.

Light emitting apparatus 187 includes lid 110, terminal 113, packing 114, heat sink 115, radiating sheet 116, light source 120, lens 130b, and substrate 140.

Lens 130b is an optical member on which light 300 emitted from light source 120 is incident and that transmits incident light 300. Lens 130b includes protrusion 408.

Protrusion 408 is a protuberance formed on lens 130b (more specifically, inner surface 131 of lens 130b) and protruding to substrate 140 to be in contact with substrate 140 (more specifically, main surface 141 of substrate 140). Protrusion 408 is formed on only a part of inner surface 131 of lens 130b to be in contact with substrate 140. This causes substrate 140 to be disposed such that the direction normal to main surface 141 of substrate 140 points away from body portion 210, light source 120 being placed on main surface 141. In this variation, optical axis 310b of light 300 emitted from light source 120 corresponds to the direction normal to main surface 141 of substrate 140. That is, the direction normal to main surface 141 of substrate 140 is the same direction as light source 120 emits light 300. In this variation, the direction normal to main surface 141 is parallel to optical axis 310b and points in a positive Y-axis direction and in the negative Z-axis direction. In this manner, in light emitting apparatus 187, protrusion 408 causes the direction normal to main surface 141 of substrate 140 to point away from body portion 210. As a result, light source 120 emits light 300 away from body portion 210. Accordingly, light emitting apparatus 187 can reduce the amount of light 300 traveling to body portion 210 with a simple configuration.

Note that the shape of light emitter lenses 124, 124a illustrated in FIGS. 11 to 14 are mere examples. Any changes may be made to the light emitter lenses. For example, the light emitter lenses may include three inclined surfaces, may include convex inclined surfaces, or the like.

<Variation 7>

Figure 16:
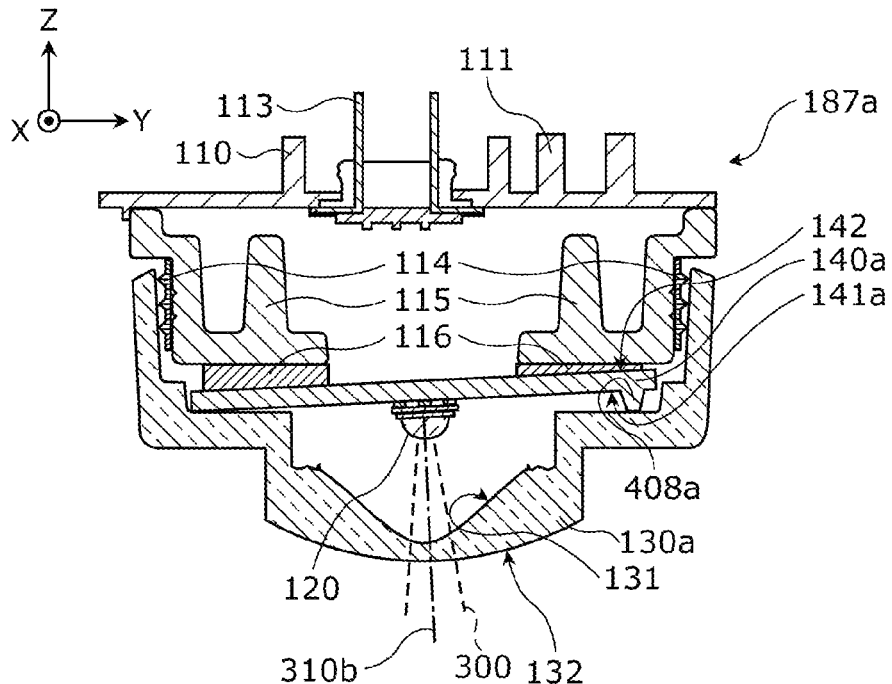
FIG. 16 is a cross-sectional view of a light emitting apparatus according to Variation 7 of Embodiment 3.

FIG. 16 is a cross-sectional view of light emitting apparatus 187a according to Variation 7 of Embodiment 3.

Light emitting apparatus 187a includes lid 110, terminal 113, packing 114, heat sink 115, radiating sheet 116, light source 120, lens 130a, and substrate 140a.

Substrate 140a includes main surface 141a on which light source 120 is placed. Substrate 140a includes protrusion 408a.

Protrusion 408a is a protuberance formed on substrate 140a (more specifically, main surface 141a of substrate 140a) and protruding to lens 130a to be in contact with lens 130a (more specifically, inner surface 131 of lens 130a). Protrusion 408a is formed on only a part of main surface 141a of substrate 140a to be in contact with lens 130a. This causes substrate 140a to be disposed such that the direction normal to main surface 141a of substrate 140a points away from body portion 210, light source 120 being placed on main surface 141a. In this variation, optical axis 310b of light 300 emitted from light source 120 corresponds to the direction normal to main surface 141a of substrate 140a. That is, the direction normal to main surface 141a of substrate 140a is the same direction as light source 120 emits light 300. In this manner, in light emitting apparatus 187a, protrusion 408a causes the direction normal to main surface 141a of substrate 140a to point away from body portion 210. As a result, light source 120 emits light 300 away from body portion 210. Accordingly, light emitting apparatus 187a can reduce the amount of light 300 traveling to body portion 210 with a simple configuration.

<Variation 8>

Figure 17:
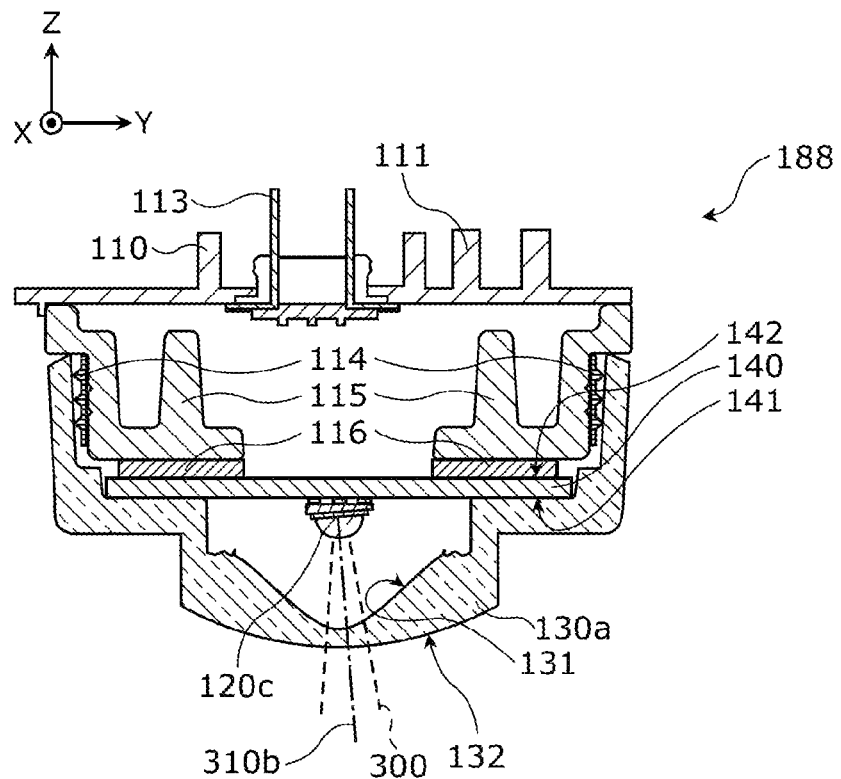
FIG. 17 is a cross-sectional view of a light emitting apparatus according to Variation 8 of Embodiment 3.

FIG. 17 is a cross-sectional view of light emitting apparatus 188 according to Variation 8 of Embodiment 3.

Light emitting apparatus 188 includes lid 110, terminal 113, packing 114, heat sink 115, radiating sheet 116, light source 120c, lens 130a, and substrate 140.

Figure 18:
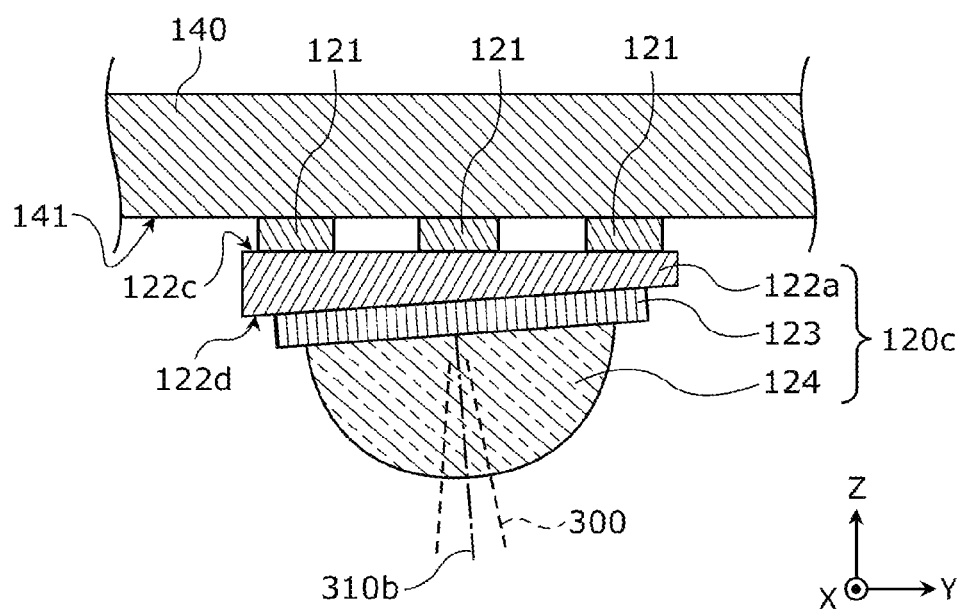
FIG. 18 is a cross-sectional view of a light source according to Variation 8 of Embodiment 3.

FIG. 18 is a cross-sectional view of light source 120c according to Variation 8 of Embodiment 3.

Light source 120c is an illuminant that emits light 300. Light source 120c emits, for example, light 300 that is near-infrared light.

Light source 120c includes mounting substrate 122a, light emitter 123, and light emitter lens 124.

Mounting substrate 122a is a substrate on which light emitter 123 that emits light 300 is mounted. Mounting substrate 122a is connected to substrate 140 at connection surface 122c with adhesive portions 121 that are adhesive members such as solder in between, connection surface 122c being the opposite surface of mounting surface 122d on which light emitter 123 is mounted.

Here, mounting substrate 122a is disposed such that the direction normal to mounting surface 122d of mounting substrate 122a points away from body portion 210, light emitter 123 being placed on mounting surface 122d. For example, main surface 141 of substrate 140 and connection surface 122c of mounting substrate 122a are parallel to each other. Moreover, connection surface 122c of mounting substrate 122a and mounting surface 122d of mounting substrate 122a are not parallel to each other and intersect each other. That is, main surface 141 of substrate 140 and mounting surface 122d of mounting substrate 122a are not parallel to each other and intersect each other.

In this variation, optical axis 310b of light 300 emitted from light source 120c corresponds to the direction normal to mounting surface 122d of mounting substrate 122a. That is, the direction normal to mounting surface 122d of mounting substrate 122a is the same direction as light source 120c emits light 300. In this manner, in light emitting apparatus 188, mounting substrate 122a includes mounting surface 122d such that the direction normal to mounting surface 122d of mounting substrate 122a points away from body portion 210. As a result, light source 120c emits light 300 away from body portion 210. Accordingly, light emitting apparatus 188 can reduce the amount of light 300 traveling to body portion 210 with a simple configuration.

Note that the angle formed between connection surface 122c and mounting surface 122d is not limited in particular and need only be an angle that allows light 300 to be emitted to a road surface.

<Variation 9>

Figure 19:
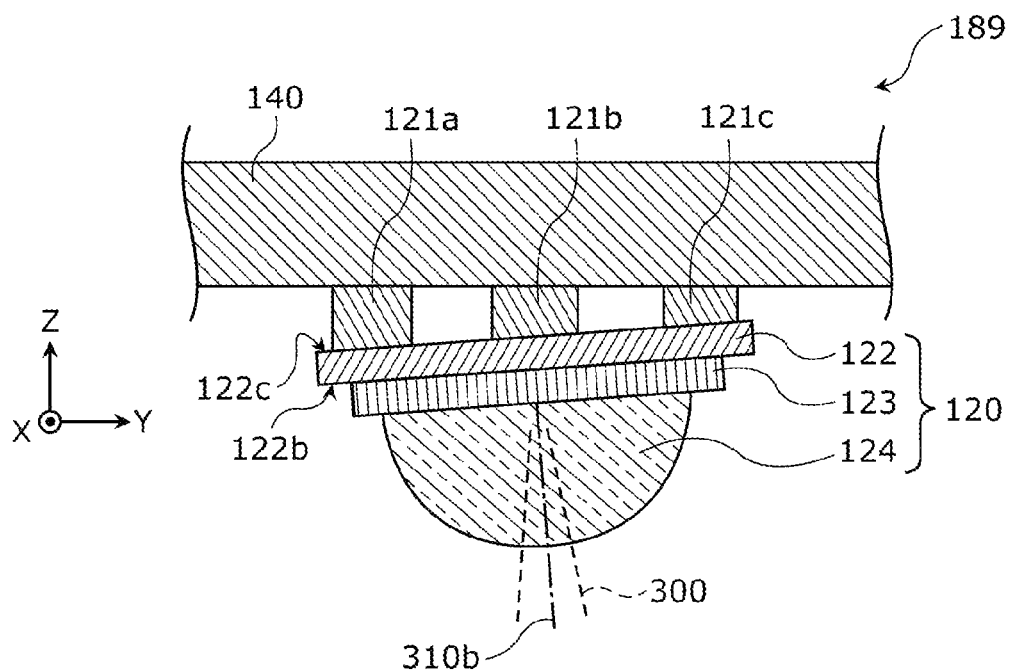
FIG. 19 is a cross-sectional view of a light emitting apparatus according to Variation 9 of Embodiment 3.

FIG. 19 is a cross-sectional view of light emitting apparatus 189 according to Variation 9 of Embodiment 3. Note that FIG. 19 is an enlarged view of a part in the vicinity of light source 120 included in light emitting apparatus 189 according to Variation 9 of Embodiment 3. The elements of light emitting apparatus 189 are similar to those of light emitting apparatus 188 except for the light source and the adhesive portions.

In light emitting apparatus 189 according to Variation 9 of Embodiment 3, mounting substrate 122 is connected to substrate 140 at connection surface 122c with adhesive portions 121a, 121b, and 121c that are adhesive members such as solder in between, connection surface 122c being the opposite surface of mounting surface 122b on which light emitter 123 is mounted.

Adhesive portions 121a, 121b, and 121c are the adhesive members disposed between light source 120 and substrate 140 on which light source 120 is placed to bond light source 120 and substrate 140 together.

Adhesive portion 121a, adhesive portion 121b, and adhesive portion 121c are disposed in stated order. Adhesive portion 121a is located closer to body portion 210 than adhesive portions 121b and 121c are. Moreover, adhesive portion 121b is located closer to body portion 210 than adhesive portion 121c is.

Here, the width of adhesive portion 121a from substrate 140 to light source 120 is greater than those of adhesive portions 121b and 121c. More specifically, the length of adhesive portion 121a from main surface 141 of substrate 140 to connection surface 122c of mounting substrate 122 included in light source 120 is greater than those of adhesive portions 121b and 121c. Moreover, the width of adhesive portion 121b from substrate 140 to light source 120 is greater than that of adhesive portion 121c.

In this manner, the widths of the multiple adhesive portions (adhesive portions 121a, 121b, and 121c), included in light emitting apparatus 189, from substrate 140 to light source 120 become greater as the adhesive portions get closer to body portion 210. For example, the adhesive portions included in light emitting apparatus 189 include a first adhesive portion (for example, adhesive portion 121a) located adjacent to body portion 210 and a second adhesive portion (for example, adhesive portion 121c) located away from body portion 210. The width of the first adhesive portion from substrate 140 to light source 120 is greater than that of the second adhesive portion. In this variation, the length of the first adhesive portion along the Z-axis is greater than that of the second adhesive portion. In this manner, in light emitting apparatus 189, adhesive portions 121a, 121b, and 121c serve as a dimmer that is a structure for reducing light 300 traveling to body portion 210.

According to this, the direction normal to mounting substrate 122 points away from body portion 210. In this variation, optical axis 310b of light 300 emitted from light source 120 corresponds to the direction normal to mounting surface 122b of mounting substrate 122. That is, the direction normal to mounting surface 122b of mounting substrate 122 is the same direction as light source 120 emits light 300. In this manner, in light emitting apparatus 189, adhesive portions 121a, 121b, and 121c cause the direction normal to mounting surface 122b of mounting substrate 122 to point away from body portion 210. As a result, light source 120 emits light 300 away from body portion 210. Accordingly, light emitting apparatus 189 can reduce the amount of light 300 traveling to body portion 210 with a simple configuration.

Embodiment 4

Next, Embodiment 4 will be described. In the description of Embodiment 4, differences from Embodiments 1 to 3 will be mainly described. Configurations substantially similar to those described in Embodiments 1 to 3 are given similar reference signs, and descriptions thereof may be partially simplified or omitted.

Figure 20:
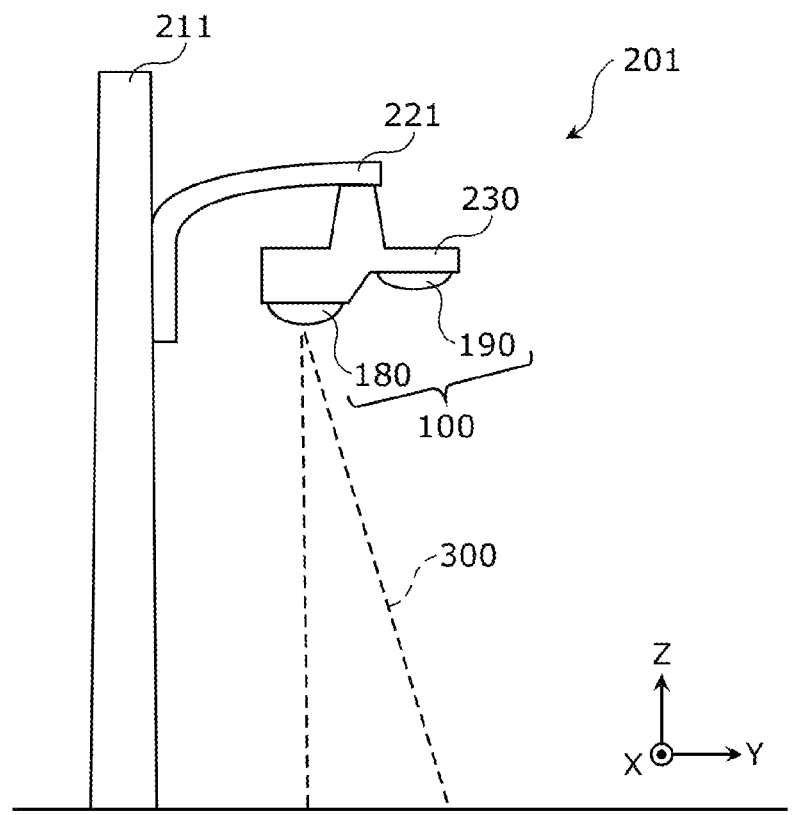
FIG. 20 is a front view of a monitoring system according to Embodiment 4.

FIG. 20 is a front view of monitoring system 201 according to Embodiment 4.

Monitoring system 201 is an imaging system including light source unit 100. In this embodiment, monitoring system 201 includes pole (first support) 211, support portion (second support) 221, stepped portion 230, and light source unit 100.

Pole 211 is a pillar-shaped member, such as a utility pole, that supports support portion 221. Pole 211 supports support portion 221 on a side of pole 211.

Support portion 221 is a support that supports light source unit 100 and is a member attached to the side of pole 211. Support portion 221 is, for example, a street light (lighting unit) attached to a utility pole. Support portion 221 is supported by pole 211 on the side of pole 211 and extends laterally from pole 211. Support portion 221 supports light source unit 100 with stepped portion 230 in between.

As described above, the light emitting apparatuses and the light source units according to the embodiments are suitable not only for mobile body 200 but for systems such as monitoring system 201 with configurations where light emitted from a light emitting apparatus is reflected from a first support.

Moreover, in this embodiment, pole 211, light emitting apparatus 180, and imaging apparatus 190 are arranged in stated order. Pole 211, imaging apparatus 190, and light emitting apparatus 180 may be arranged in stated order.

Moreover, imaging apparatus 190 may be located at the position away from light emitting apparatus 180 in the opposite direction to that in which light emitting apparatus 180 emits light 300 (in this embodiment, downward and in the negative Z-axis direction). In this embodiment, imaging apparatus 190 is located above light emitting apparatus 180.

In this embodiment, monitoring system 201 includes stepped portion 230 including multiple surfaces of which the heights differ from each other in the direction in which light emitting apparatus 180 emits light 300. Light emitting apparatus 180 and imaging apparatus 190 are disposed on respective surfaces that differ from each other out of the multiple surfaces.

According to this, light 300 emitted from light emitting apparatus 180 is prevented from being directly incident on imaging apparatus 190 without being reflected from the road surface.

Embodiment 5

Next, Embodiment 5 will be described. In the description of Embodiment 5, differences from Embodiments 1 to 4 will be mainly described. Configurations substantially similar to those described in Embodiments 1 to 4 are given similar reference signs, and descriptions thereof may be partially simplified or omitted.

[Configuration]

Figure 21:
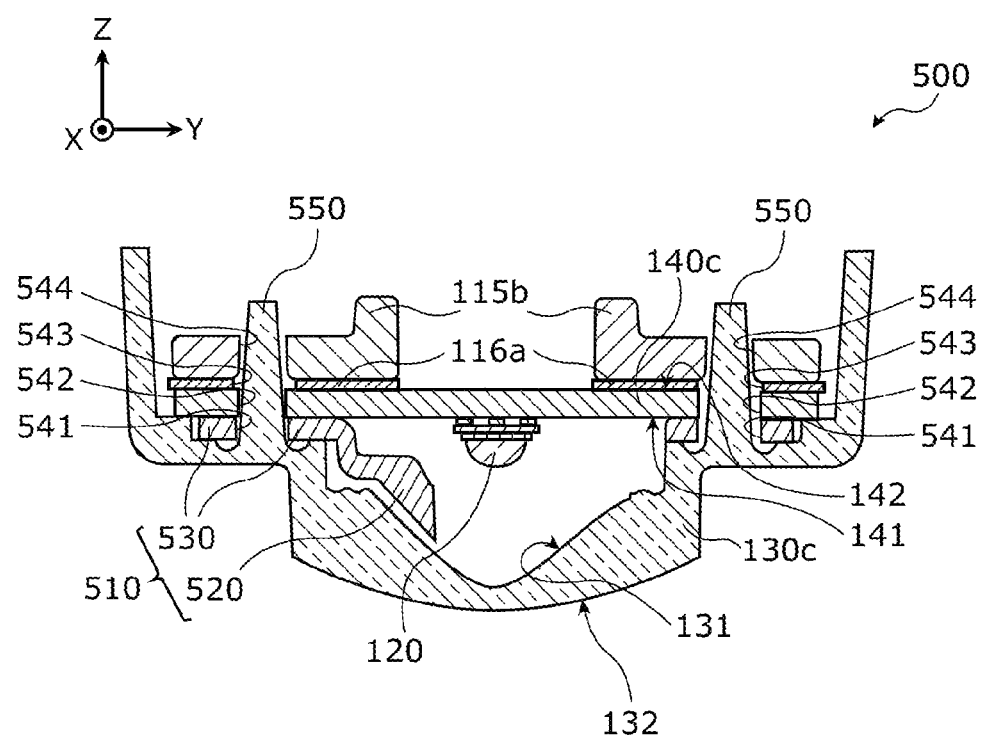
FIG. 21 is a cross-sectional view of a light emitting apparatus according to Embodiment 5.
Figure 22:
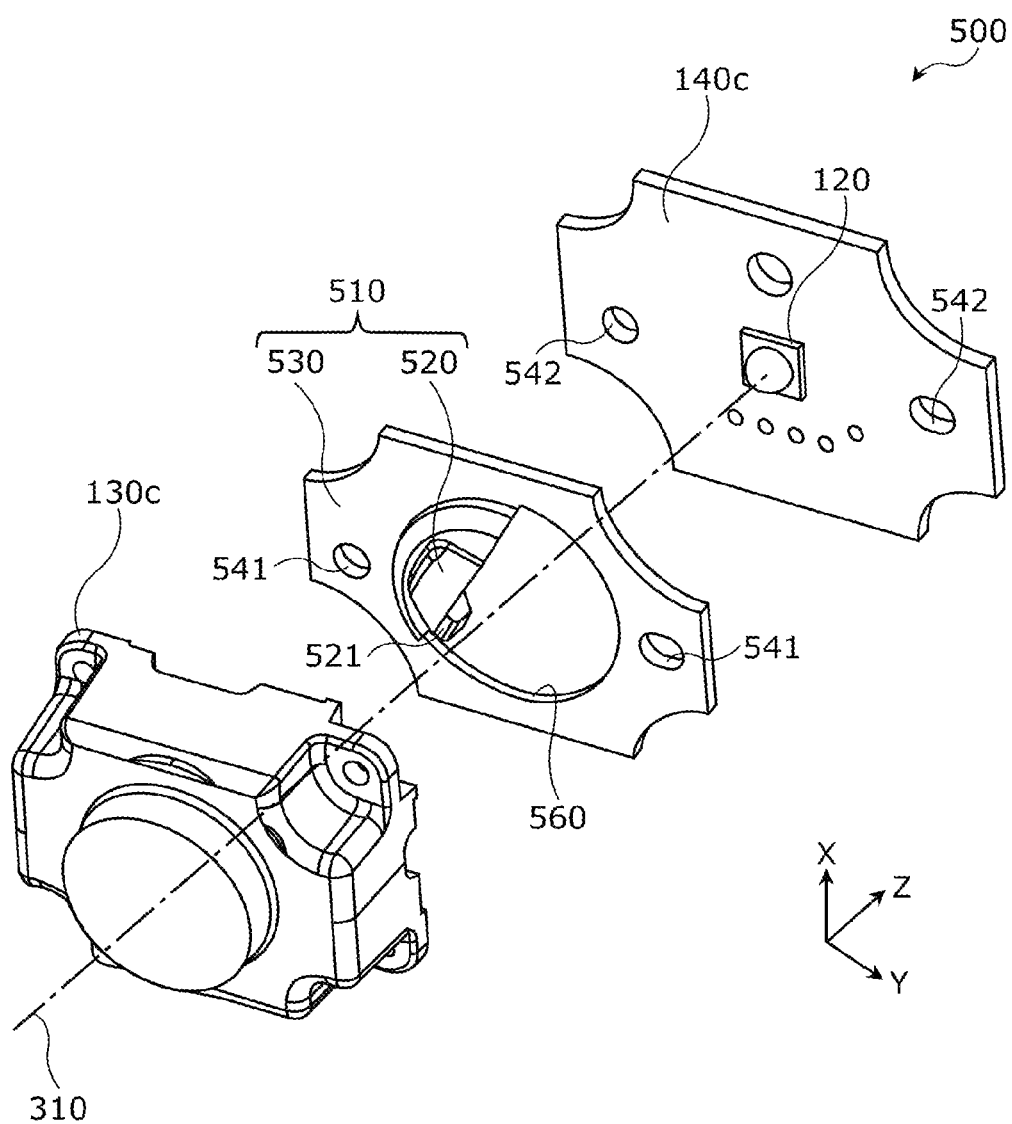
FIG. 22 is an exploded perspective view of the light emitting apparatus according to Embodiment 5.

FIG. 21 is a cross-sectional view of light emitting apparatus 500 according to Embodiment 5. FIG. 22 is an exploded perspective view of light emitting apparatus 500 according to Embodiment 5.

Note that some elements, such as lid 110, included in light emitting apparatus 500 are not illustrated in FIG. 21. For example, in addition to the elements illustrated in FIG. 21, light emitting apparatus 500 may further include lid 110, terminal 113, packing 114, and shock absorber 117 as does light emitting apparatus 180 illustrated in FIG. 3. Moreover, FIG. 22 illustrates substrate 140c, screen 510, and lens 130c included in light emitting apparatus 500, and does not illustrate other elements.

The mobile body and the light source unit according to Embodiment 5 are the same as those according to Embodiment 1 except for the configuration of the light emitting apparatus. For example, light emitting apparatus 500 is supported by the second support supported by the first support laterally relative to the first support alongside imaging apparatus 190, and emits light to be detected by imaging apparatus 190.

Light emitting apparatus 500 emits light downward (to a road surface).

Light emitting apparatus 500 includes heat sink 115b, radiating sheet 116a, light source 120, lens 130c, substrate 140c, and screen 510.

Light emitting apparatus 500 is supported by the second support supported by the first support laterally relative to the first support alongside imaging apparatus 190, and emits light 300 to be detected by imaging apparatus 190.

For example, the first support is body portion 210 illustrated in FIG. 1, and the second support is side mirror 220 illustrated in FIG. 1. For example, when viewed in the direction of travel of mobile body 200, light emitting apparatus 500 is disposed between body portion 210 and imaging apparatus 190.

Light emitting apparatus 500 emits light to the road surface (downward). Imaging apparatus 190 detects reflected light resulting from the light reflected from the road surface to image the road surface around mobile body 200.

Note that light emitting apparatus 500 and imaging apparatus 190 may be arranged in the direction of travel of mobile body 200.

Alternatively, for example, the first support is pole 211 illustrated in FIG. 20, and the second support is support portion 221 illustrated in FIG. 20.

Heat sink 115b is a radiating member for dissipating the heat generated at light source 120 disposed on main surface (placement surface) 141 of substrate 140c. Heat sink 115b is disposed adjacent to rear surface 142, which is the opposite surface of main surface 141. Heat sink 115b is made of, for example, a metal with high thermal conductivity, such as aluminum, stainless steel, or the like. Substrate 140c is placed on heat sink 115b with radiating sheet 116a in between.

Radiating sheet 116a is a sheet-like member that facilitates dissipation of the heat generated at light source 120 from substrate 140c to heat sink 115b. Radiating sheet 116a is made of, but not limited in particular to, a resin material or the like, for example. Moreover, radiating sheet 116a may be electrically insulating.

Substrate 140c is a substrate on which light source 120 is placed. Substrate 140c is in contact with lens 130c at main surface 141 on which light source 120 is placed. Substrate 140c is, but not limited in particular to, a metal substrate, a ceramic substrate, a resin substrate, or the like, for example. Note that substrate 140c may be a flexible substrate or a rigid substrate.

Lens 130c is an optical member on which the light emitted from light source 120 is incident and that transmits the incident light. Specifically, lens 130c is a projection lens that is disposed to cover the lower side of light source 120, on which the light emitted from light source 120 is incident, and that controls distribution of the incident light to transmit the light to a road surface. Heat sink 115b, radiating sheet 116a, light source 120, and substrate 140c are accommodated in lens 130c.

Lens 130c (more specifically, the base of lens 130c) is made of, for example, a light-transmitting glass material or a transparent resin material, such as acrylic or polycarbonate.

Note that lens 130c has a convex shape protruding downward in this embodiment. However, the shape is not limited in particular, and lens 130c may have a planar shape, for example.

Screen 510 is a member disposed between light source 120 and lens 130c to at least partially absorb, reflect, or diffuse light traveling to a part of lens 130c located adjacent to the first support out of the light emitted from light source 120. For example, screen 510 has a high reflectivity of the light emitted from light source 120.

Figure 23:
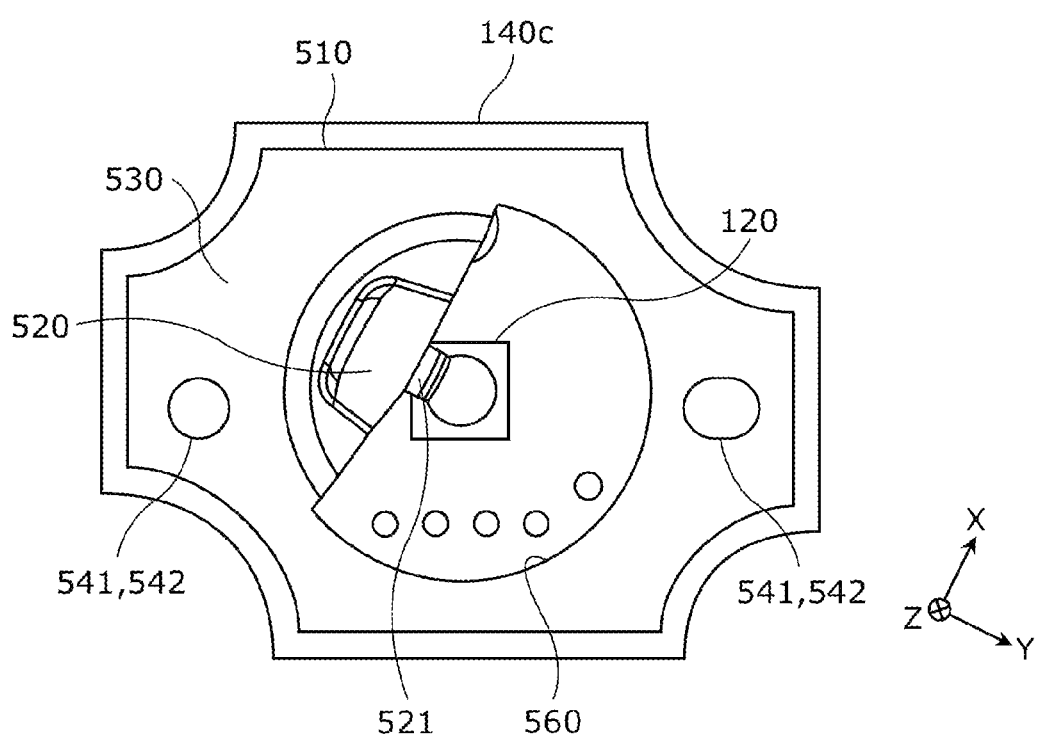
FIG. 23 is a bottom view of a screen and a light source according to Embodiment 5.
Figure 24:
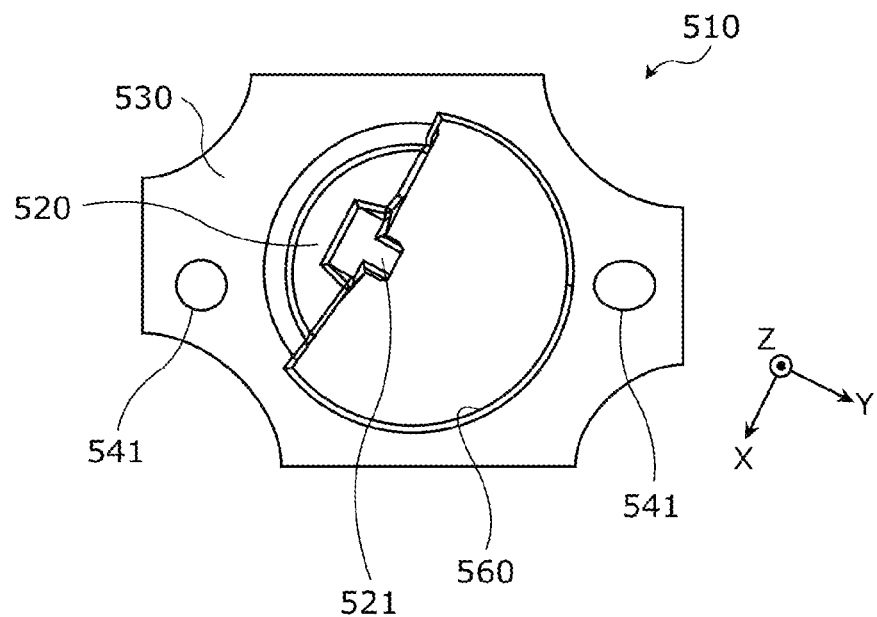
FIG. 24 is a top view of the screen according to Embodiment 5.

FIG. 23 is a bottom view of screen 510 and light source 120 according to Embodiment 5. FIG. 24 is a top view of screen 510 according to Embodiment 5.

Screen 510 includes light shield 520 and flat portion 530.

Light shield 520 is a light-blocking part disposed between lens 130c and light source 120 at a position closer to the first support (in this embodiment, in the negative Y-axis direction) than light source 120 is to at least partially absorb, reflect, or diffuse the light traveling to the part of lens 130c located adjacent to the first support out of the light emitted from light source 120.

For example, light shield 520 is provided for a part located away from the optical axis of the light emitted from light source 120 in the negative Y-axis direction. Light shield 520 has, for example, a shape curved along inner surface 131 of lens 130c (for example, a half-bowl shape).

Moreover, light shield 520 may be in contact with light source 120 but is desirably not in contact with light source 120. Placing screen 510 so as not to be in contact with light source 120 prevents the heat generated at light source 120 from being transferred to screen 510 and trapped in a space enclosed by lens 130c and substrate 140c.

Note that the distance between light shield 520 and light source 120 is not limited in particular and may be set to any desired value. The distance between light shield 520 and light source 120 is, for example, 1 mm or more.

For example, screen 510 has opening 560, which is a through-hole, in the center in plan view (viewed from below). In plan view, light source 120 is disposed at a position overlapping opening 560, for example. The light emitted from light source 120 passes through opening 560 and lens 130c and is then emitted to the outside of light emitting apparatus 500. Light shield 520 is disposed to cover a half of opening 560, which is circular in plan view, located adjacent to the first support, for example.

This causes the light emitted from light source 120 to be partially absorbed, reflected, or diffused by screen 510 (more specifically, light shield 520) and thus prevents the light emitted from light source 120 from traveling to the first support. Accordingly, light emitting apparatus 500 reduces the amount of light traveling to the first support compared with the amount of light traveling away from the first support.

Note that light shield 520 may or may not cover light source 120 in plan view.

For example, in plan view of main surface 141 of substrate 140c, light shield 520 extends continuously from a position at least partially overlapping light source 120 to a position between light source 120 and the first support. That is, for example, light shield 520 continuously covers light source 120 from a position below light source 120 and overlapping light source 120 to a side of light source 120 in plan view of main surface 141 of substrate 140c.

Note that the position overlapping light source 120 may be, for example, a position overlapping the center of light source 120 (for example, optical axis 310 of the light emitted from light source 120) in plan view, or may be a position closer to the first support than the center of light source 120 in plan view is.

In this embodiment, light shield 520 includes projection 521 covering (overlapping) a part of light source 120 when viewed from below. Providing projection 521 with an appropriate shape at an appropriate position facilitates appropriate distribution of the light emitted from light emitting apparatus 500.

Note that the size and shape of projection 521 are not limited in particular. Projection 521 may be, for example, smaller than light source 120 in plan view. According to this, for example, projection 521 can prevent light traveling to a position immediately below light source 120, the intensity of the light being the highest at the position, out of the light emitted from light source 120 from being emitted directly from lens 130c. Accordingly, unevenness in brightness of the light detected by imaging apparatus 190 can be reduced. Projection 521 has a length (width) of about 2 mm along the X-axis illustrated in FIG. 23, for example.

Flat portion 530 is a flat part disposed between lens 130c and main surface 141 of substrate 140c and placed on main surface 141. Light shield 520 and flat portion 530 are integral to each other.

Screen 510 need only be composed of a member that at least partially absorbs, reflects, or diffuses the light emitted from light source 120, and the member is not limited in particular.

Screen 510 is made of, for example, a metal material or the like having reflectivity of the light emitted from light source 120. Alternatively, screen 510 is made of a resin material or the like containing light diffusing agents, such as silica particles or titanium particles, for diffusing (or refracting) the light emitted from light source 120. Alternatively, screen 510 is made of a resin material or the like containing light absorbents, such as coloring matters, that absorb the light emitted from light source 120.

Specifically, for example, screen 510 may be made of PC (polycarbonate). In other words, for example, screen 510 may be made of a material containing polycarbonate. Alternatively, for example, screen 510 may be made of PP (polypropylene), PPS (polyphenylene sulfide), or PMMA (polymethyl methacrylate, so-called acrylic).

Note that light shield 520 and flat portion 530 may be made of the same material or made of different materials. In a case where light shield 520 and flat portion 530 are made of different materials, light shield 520 need only have a configuration that enables absorption, reflection, or diffusion of the light emitted from light source 120, and flat portion 530 may have any configuration. Moreover, the configuration that enables absorption, reflection, or diffusion may be a configuration that enables absorption of part of light and reflection of the other part of light, a configuration that enables absorption of part of light and diffusion of the other part of light, or a configuration obtained by freely combining configurations for absorption, reflection, and diffusion. That is, screen 510 need only have a configuration that enables at least one of absorption, reflection, or diffusion.

Moreover, the thicknesses of light shield 520 and flat portion 530 are not limited in particular. For example, the thickness (for example, thickness of the thinnest part) of flat portion 530 is about 1 mm.

Moreover, screen 510 need only be able to at least partially absorb, reflect, or diffuse light; for example, to absorb, reflect, or diffuse 70% or more to 90% or more of light.

Specifically, for example, screen 510 may be able to reflect 70% or more of the light emitted from light source 120. Moreover, for example, screen 510 may be able to reflect 80% or more of the light emitted from light source 120. Moreover, for example, screen 510 may be able to reflect 90% or more of the light emitted from light source 120.

Moreover, for example, screen 510 may be able to transmit 20% or less of the light emitted from light source 120. Moreover, for example, screen 510 may be able to transmit 5% or less of the light emitted from light source 120. Moreover, for example, screen 510 may be able to transmit 1% or less of the light emitted from light source 120.

Note that the transmittance of 20%, 5%, or the like herein refers to the transmittance of light when the thickness of screen 510 is, for example, 2 mm.

Moreover, the color of screen 510 may be, but not limited in particular to, black, white, or any other color. However, the color is desirably white. According to this, screen 510 is prevented from generating heat by light.

Moreover, the surface of screen 510 may be provided with a recess (gradually changing portion) extending to the outer edge in plan view. Moreover, screen 510 (for example, flat portion 530) may include a part (gradually changing portion) of which the thickness gradually decreases from the center to the outer edge in plan view. According to this, the plane stiffness increases, and thus resistance to vibration increases. In addition, deformation, such as warpage, caused by contraction or the like can be prevented. Moreover, the surface of lens 130c facing the recess may be provided with a recess.

Moreover, screen 510 may include a beam (so-called rib). Specifically, flat portion 530 may include a beam at an edge located adjacent to the first support. According to this, unusual noise is prevented from being generated at light emitting apparatus 500.

Moreover, flat portion 530 may include both the gradually changing portion and the beam. According to this, unusual noise is further prevented from being generated at light emitting apparatus 500.

Moreover, screen 510 (more specifically, flat portion 530) has through-holes 541 passing through screen 510 in the direction normal to the main surface of flat portion 530 (in this embodiment, in the Z-axis direction). Moreover, substrate 140c has through-holes 542 passing through substrate 140c in the direction normal to main surface 141 (in this embodiment, in the Z-axis direction). Moreover, radiating sheet 116a has through-holes 543 passing through radiating sheet 116a in the direction normal to the main surface of radiating sheet 116a (in this embodiment, in the Z-axis direction). Moreover, heat sink 115b has through-holes 544 passing through heat sink 115b in the direction normal to the main surface of heat sink 115b (in this embodiment, in the Z-axis direction).

Through-holes 541 to 544 are superposed on each other when viewed from below. Engagers 550 provided for lens 130c are placed through through-holes 541 to 544.

Engagers 550 are pillar-shaped portions provided for lens 130c. The configuration where engagers 550 are placed through through-holes 541 to 544 facilitates positioning of heat sink 115b, radiating sheet 116a, substrate 140c, screen 510, and lens 130c.

Engagers 550 are placed through through-holes 541 to 544 (that is, the elements are positioned) and then worked on (deformed) through heat staking or the like so as not to be detached from through-holes 541 to 544.

Note that, although heat sink 115b, radiating sheet 116a, substrate 140c, and screen 510 respectively have two through-holes 541 to 544, the numbers of the holes may be one, or three or more. The number of engagers 550 provided for lens 130c need only correspond to the numbers of through-holes 541 to 544.

Moreover, the positions of through-holes 541 to 544 are not limited in particular and may be freely set. For example, in plan view, screen 510 may have two through-holes 541 at positions opposite to each other with respect to opening 560 (for example, diagonal positions).

Moreover, heat sink 115b, radiating sheet 116a, substrate 140c, and screen 510 may have additional through-holes (air holes) that are different from through-holes 541 to 544 and that communicate with each other. According to this, air in an area enclosed by lens 130c and substrate 140c can enter and exit the area through the air holes, preventing heat from being trapped in the area. Note that heat sink 115b, radiating sheet 116a, substrate 140c, and screen 510 may respectively have the air holes at two locations, for example. According to this, positive pressure is applied to one of the air holes, and negative pressure is applied to the other air hole; that is, the air holes at the two locations function as an entrance and exit of the air in the area. Accordingly, heat is further prevented from being trapped in the area.

Moreover, the air holes may be provided with breathable, waterproof seals (so-called water-blocking sheets).

Moreover, for example, screen 510 may include pins (for example, protuberances) to be positioned relative to lens 130c. Moreover, lens 130c may be provided with recesses engaging with the protuberances.

[Effects and the Like]

As described above, light emitting apparatus 500 according to Embodiment 5 is supported by the second support (for example, side mirror 220) supported by the first support (for example, body portion 210) laterally relative to the first support alongside imaging apparatus 190, and emits light to be used for imaging by imaging apparatus 190. Light emitting apparatus 500 includes light source 120 that emits the light and lens 130c on which the light emitted from light source 120 is incident and that transmits the incident light. Out of the light emitted from light source 120, the amount of light traveling to the part of lens 130c located adjacent to the first support (in this embodiment, in the negative Y-axis direction) is less than the amount of light traveling to the part of lens 130c located away from the first support. Moreover, light emitting apparatus 500 further includes screen 510 disposed between light source 120 and lens 130c. Screen 510 at least partially absorbs, reflects, or diffuses the light traveling to the part of lens 130c located adjacent to the first support out of the light emitted from light source 120. Light emitting apparatus 500 further includes substrate 140c including the placement surface (main surface 141) on which light source 120 is placed. Screen 510 includes light shield 520 and flat portion 530, for example. Light shield 520 is disposed between lens 130c and light source 120 at the position closer to the first support than light source 120 is, and at least partially absorbs, reflects, or diffuses the light traveling to the part of lens 130c located adjacent to the first support out of the light emitted from light source 120. Flat portion 530 is placed on main surface 141 between lens 130c and main surface 141.

According to this, light shield 520 can reduce the light traveling to the first support out of the light emitted from light source 120. Furthermore, an assembly apparatus, such as a robot including a suction head and the like, that assembles light emitting apparatus 500 can easily adhere to flat portion 530 using the suction head. Accordingly, the production of light emitting apparatus 500 is facilitated by flat portion 530. Furthermore, placing flat portion 530 between substrate 140c and lens 130c, specifically, interposing flat portion 530 between substrate 140c and lens 130c prevents misalignment of screen 510. Accordingly, the optical properties of light emitting apparatus 500 do not change easily by vibration or the like.

Moreover, for example, in plan view of main surface 141, light shield 520 extends continuously from the position at least partially overlapping light source 120 to the position between light source 120 and the first support.

According to this, light shield 520 can further prevent the light emitted from light source 120 from traveling to the first support. Accordingly, light emitting apparatus 500 further prevents halation.

Moreover, for example, screen 510 includes polycarbonate. That is, screen 510 is made of polycarbonate.

Polycarbonate can easily contain materials for, for example, reflecting the light emitted from light source 120. According to this, reflectance, from screen 510, of the light emitted from light source 120 can be increased. Moreover, polycarbonate can easily be shaped into any desired shapes. According to this, surface treatment or deformation can be performed so that reflectance, from screen 510, of the light emitted from light source 120 is increased.

[Variation]

Next, a variation of Embodiment 5 will be described. In the description of the variation of Embodiment 5, differences from Embodiment 5 will be mainly described. Configurations substantially similar to those described in Embodiment 5 are given similar reference signs, and descriptions thereof may be partially simplified or omitted.

Figure 25:
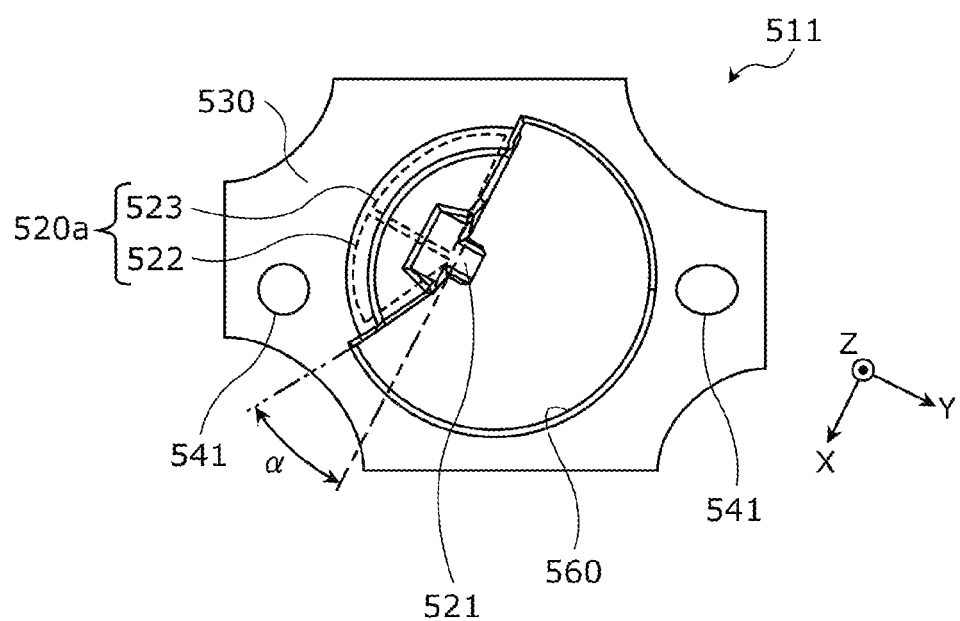
FIG. 25 is a top view of a screen according to a variation of Embodiment 5.

FIG. 25 is a top view of screen 511 according to the variation of Embodiment 5.

As is screen 510, screen 511 is a member disposed between light source 120 and lens 130c to at least partially absorb, reflect, or diffuse the light traveling to the part of lens 130c located adjacent to the first support out of the light emitted from light source 120. For example, screen 511 has a high reflectivity of the light emitted from light source 120.

Screen 511 includes light shield 520a and flat portion 530.

As is light shield 520, light shield 520a is a light-blocking part disposed between lens 130c and light source 120 at a position closer to the first support (in this variation, in the negative Y-axis direction) than light source 120 is to at least partially absorb, reflect, or diffuse the light traveling to the part of lens 130c located adjacent to the first support out of the light emitted from light source 120.

For example, light shield 520a is provided for a part located away from the optical axis of the light emitted from light source 120 in the negative Y-axis direction. Light shield 520a has, for example, a shape curved along inner surface 131 of lens 130c (for example, a half-bowl shape).

As described above, the light emitting apparatus according to the present invention is supported by the second support (for example, side mirror 220) supported by the first support (for example, body portion 210 of mobile body 200) laterally relative to the first support alongside imaging apparatus 190, and emits light to be used for imaging by imaging apparatus 190, for example.

Here, out of the light traveling to the part of lens 130c located adjacent to mobile body 200, light shield 520a absorbs, reflects, or diffuses more light traveling backward in the direction of travel of mobile body 200 relative to light source 120 than light traveling forward in the direction of travel of mobile body 200 relative to light source 120. In other words, out of the light traveling to the part of lens 130c located adjacent to mobile body 200, light shield 520a absorbs, reflects, or diffuses the light traveling forward in the direction of travel of mobile body 200 relative to light source 120 by a less amount than the light traveling backward in the direction of travel of mobile body 200 relative to light source 120.

In this variation, in plan view, the area of first light shield 522 of light shield 520a located forward in the direction of travel of mobile body 200 is smaller than the area of second light shield 523 of light shield 520a located backward in the direction of travel of mobile body 200. That is, first light shield 522 includes a smaller part that blocks the light emitted from light source 120 than second light shield 523.

According to this, light shield 520a blocks less light traveling forward in the direction of travel of mobile body 200 out of the light emitted from light source 120.

In the case where mobile body 200 is a vehicle such as an automobile, side mirrors 220 may be attached to body portion 210 in different manners depending on whether mobile body 200 is a left-hand drive car or a right-hand drive car. For example, in a case where mobile body 200 is a left-hand drive car, an end of side mirror 220 located away from body portion 210 tends to be located forward in the direction of travel of mobile body 200 compared with a case where mobile body 200 is a right-hand drive car. Side mirror 220 located as described above causes the amount of light emitted from the light emitting apparatus forward in the direction of travel of mobile body 200 to be less than the amount of light emitted from the light emitting apparatus forward in the direction of travel of mobile body 200 in the case where side mirror 220 is attached to a right-hand drive car. Accordingly, when viewed from immediately below imaging apparatus 190, the road surface located forward in the direction of travel of mobile body 200 cannot be imaged appropriately.

To prevent this, the light traveling forward in the direction of travel of mobile body 200 out of the light emitted from light source 120 is prevented from being completely blocked (absorbed, reflected, or diffused) by light shield 520a. Thus, when viewed from immediately below imaging apparatus 190, the road surface located forward in the direction of travel of mobile body 200 can be imaged appropriately even when the attachment position of side mirror 220 on body portion 210 is changed.

For example, as illustrated in FIG. 24, a side of light shield 520 located in a positive Y-axis direction in screen 510 is linear in plan view.

In contrast, for example, as illustrated in FIG. 25, a side of light shield 520a located in the positive Y-axis direction in screen 511 is bent at the middle of the side in plan view. For example, when viewed from the middle, angle α formed between a virtual line (dashed-double-dotted line shown in FIG. 25) obtained by extending a part of the side located in a negative X-axis direction (side included in second light shield 523) and a part of the side located in a positive X-axis direction (side included in first light shield 522) is greater than 0. That is, angle α formed between the dashed-double-dotted line shown in FIG. 25 and a virtual line (dashed-triple-dotted line shown in FIG. 25) obtained by extending the part of the side located in the positive X-axis direction when viewed from the middle is greater than 0. In contrast, a is approximately 0 in screen 510.

Note that angle α may be set to any desired value. For example, angle α may be 5 degrees or more, or 10 degrees or more. Moreover, for example, angle α may be 30 degrees or less.

Moreover, in the above-described example, the area of first light shield 522 is smaller than that of second light shield 523, allowing light shield 520a to absorb, reflect, or diffuse more light traveling backward in the direction of travel of mobile body 200 relative to light source 120 than the light traveling forward in the direction of travel of mobile body 200 relative to light source 120 out of the light traveling to the part of lens 130c located adjacent to mobile body 200. For example, even in a case where first light shield 522 and second light shield 523 have the same area, light shield 520a may absorb, reflect, or diffuse more light traveling backward in the direction of travel of mobile body 200 relative to light source 120 than the light traveling forward in the direction of travel of mobile body 200 relative to light source 120 out of the light traveling to the part of lens 130c located adjacent to mobile body 200 using first light shield 522 and second light shield 523 with optical properties, such as reflectance and transmittance, different from each other.

Moreover, for example, light shield 520a does not need to include first light shield 522 and may include only second light shield 523. That is, out of the light traveling to the part of lens 130c located adjacent to mobile body 200, light shield 520a may absorb, reflect, or diffuse only the light traveling backward in the direction of travel of mobile body 200 relative to light source 120. In other words, light shield 520a may be located between light source 120 and lens 130c, closer to mobile body 200 than light source 120 is, and backward in the direction of travel of mobile body 200.

Other Embodiments

Although the light emitting apparatuses and the like according to the embodiments and variations have been described above, the above-described embodiments and variations are not intended to limit the present invention.

For example, in the above-described embodiments, an LED is used as a specific example of the illuminant included in the light emitter. However, a semiconductor light emitting device, such as a semiconductor laser, or a solid-state light emitting device, such as an organic EL (Electro Luminescence) device or an inorganic EL device, may be used as the illuminant.

Moreover, for example, the first support and the second support do not need to be separate elements and may be integral to each other.

Moreover, for example, the light sources may be achieved by LED modules with an SMD (Surface Mount Device) structure or by LED modules with a so-called COB (Chip On Board) structure in which an LED chip is directly mounted on a substrate.

Moreover, a recess may be provided for at least one of the inner surface or the outer surface of the lens included in each light emitting apparatus at a position adjacent to the vehicle, the light from the illuminant being transmitted through the at least one surface. According to this, the light emitted from the illuminant is refracted or reflected by the recess and thereby prevented from traveling to the vehicle.

Moreover, for example, it is desirable that the surface of the recess provided as above be smoothly connected to other parts of the lens. This prevents halation.

Note that the thickness of the lens need only be, but not limited in particular to, 0.5 mm or more at the thinnest part, for example. This improves the formability of the lens.

Moreover, for example, in the above-described embodiments, light source unit 100 is attached to side mirror 220 such that the direction in which light is emitted from light source 120 is parallel to the Z-axis direction as illustrated in FIG. 3. However, how light source unit 100 is attached to the second support is not limited to this. For example, the light source unit, the light emitting apparatus, and/or the imaging apparatus may be disposed on the second support with the optical axis freely inclined with respect to the Z-axis direction (for example, vertical direction). For example, the light source unit (more specifically, light emitting apparatus) may be disposed on the second support (for example, side mirror 220) such that the optical axis of the light source unit is inclined with respect to the vertical direction away from the first support (for example, body portion 210) at about 10° to 20°.

The scope of the present invention encompasses forms obtained by various modifications, to the embodiments, that can be conceived by those skilled in the art and forms achieved by freely combining elements and functions in different embodiments without departing from the spirit of the present invention as well.

For example, the light emitter included in light emitting apparatus 500 does not need to be light source 120 and may be any one of light sources 120a to 120c.

Moreover, for example, light emitting apparatus 500 may include dimmer 400, dimmer 400a, or dimmer 403.

In these manners, the elements included in the light source unit according to the embodiments and variations may be freely combined to be achieved without departing from the spirit of the present invention.

REFERENCE SIGNS LIST 100 light source unit
115, 115a, 115b heat sink
120, 120a, 120b, 120c light source
121, 121a, 121b, 121c adhesive portion
122, 122a mounting substrate
122b, 122d mounting surface
123 light emitter
124, 124a light emitter lens
130, 130a, 130b, 130c, 1300 lens
131 inner surface
132 outer surface
140, 140a, 140c substrate
141, 141a main surface (placement surface)
180, 180a, 181, 182, 183, 184, 185, 186, 187, 187a, 188, 189,
500 light emitting apparatus
190 imaging apparatus
200 mobile body
210 body portion (first support)
211 pole (first support)
220 side mirror (second support)
221 support portion (second support)
300, 301, 302 light
310, 310a, 310b optical axis
400, 400a, 403 dimmer
401 inside dimmer
402 outside dimmer
404, 405, 406, 407, 510, 511 screen
408, 408a protrusion
520, 520a light shield
530 flat portion

What is claimed is:

1. A light emitting apparatus that is supported by a second support supported by a first support laterally relative to the first support alongside an imaging apparatus and that emits light to be detected by the imaging apparatus, the light emitting apparatus comprising:
    a light source that emits the light;
    a lens on which the light emitted from the light source is incident and that transmits the light incident on the lens;
    a screen disposed between the light source and the lens; and
    a substrate including a placement surface on which the light source is placed, wherein
    the lens includes a part provided with a dimmer that at least partially reduces light to be emitted to the first support out of the light incident on the lens, and
    the screen includes:
        a light shield disposed between the lens and the light source at a position closer to the first support than the light source is to at least partially absorb, reflect, or diffuse the light traveling to the part of the lens located adjacent to the first support out of the light emitted from the light source; and
        a flat portion placed on the placement surface between the lens and the placement surface.

2. The light emitting apparatus according to claim 1, wherein
    the dimmer is provided on a surface of the lens facing the light source.

3. The light emitting apparatus according to claim 1, wherein
    the dimmer is provided on a surface of the lens opposite to a surface facing the light source.

4. The light emitting apparatus according to claim 1, wherein
    the dimmer includes a structure formed by texturing, vapor deposition, two-component injection molding, insert molding, or laser radiation.

5. The light emitting apparatus according to claim 1, wherein
    the dimmer reduces light transmitted through the lens by absorbing, reflecting, or diffusing the light incident on the lens.

6. The light emitting apparatus according to claim 1, wherein
    the light source emits the light that is near-infrared light.

7. A light source unit comprising:
    the light emitting apparatus according to claim 1; and
    the imaging apparatus.

8. A mobile body comprising:
    the light source unit according to claim 7;
    a body portion that is the first support; and
    a side mirror that is the second support, wherein
    the light emitting apparatus is attached to the side mirror to emit the light to a road surface, and
    the imaging apparatus detects the light reflected from the road surface to create an image of the road surface.

9. A light emitting apparatus that is supported by a second support supported by a first support laterally relative to the first support alongside an imaging apparatus and that emits light to be detected by the imaging apparatus, the light emitting apparatus comprising:

a light source that emits the light;

a lens on which the light emitted from the light source is incident and that transmits the light incident on the lens;

a screen disposed between the light source and the lens;

a substrate including a placement surface on which the light source is placed; and a dimmer that at least partially reflects or diffuses light traveling to the first support out of the light transmitted through the lens, wherein the screen includes:

a light shield disposed between the lens and the light source at a position closer to the first support than the light source is to at least partially absorb, reflect, or diffuse the light traveling to the part of the lens located adjacent to the first support out of the light emitted from the light source; and a flat portion placed on the placement surface between the lens and the placement surface.

10. The light emitting apparatus according to claim 9, wherein the dimmer is disposed to be in contact with a surface of the lens opposite to a surface facing the light source.

11. A light emitting apparatus that is supported by a second support supported by a first support laterally relative to the first support alongside an imaging apparatus and that emits light to be detected by the imaging apparatus, the light emitting apparatus comprising:

a light source that emits the light;

a lens on which the light emitted from the light source is incident and that transmits the light incident on the lens;

a screen disposed between the light source and the lens; and a substrate including a placement surface on which the light source is placed, wherein out of the light emitted from the light source, an amount of light traveling to a part of the lens located adjacent to the first support is less than an amount of light traveling to a part of the lens located away from the first support, and the screen includes:

a light shield disposed between the lens and the light source at a position closer to the first support than the light source is to at least partially absorb, reflect, or diffuse the light traveling to the part of the lens located adjacent to the first support out of the light emitted from the light source; and a flat portion placed on the placement surface between the lens and the placement surface.

12. The light emitting apparatus according to claim 11, wherein in plan view of the placement surface, the light shield extends continuously from a position at least partially overlapping the light source to a position between the light source and the first support.

13. The light emitting apparatus according to claim 10, wherein the first support is a body portion of a mobile body, the second support is a side mirror provided for the body portion, and out of light traveling to a part of the lens located adjacent to the mobile body, the light shield absorbs, reflects, or diffuses more light traveling backward in a direction of travel of the mobile body relative to the light source than light traveling forward in the direction of travel of the mobile body relative to the light source.

14. The light emitting apparatus according to claim 11, wherein the screen includes polycarbonate.

15. The light emitting apparatus according to claim 11, wherein the screen is an electronic component disposed on the substrate.

16. The light emitting apparatus according to claim 11, further comprising:

a heat sink on which the substrate is placed, wherein the screen is a part of the heat sink and passes through the substrate to be disposed between the light source and the lens.

17. The light emitting apparatus according to claim 11, wherein the light source includes:

a light emitter that emits the light; and a light emitter lens on which the light emitted from the light emitter is incident and that transmits the light incident on the light emitter lens to the lens, wherein a surface of the light emitter lens located adjacent to the first support is a flat surface inclined with respect to an optical axis of the light emitted from the light emitter or a curved surface protruding toward the light emitter.

18. The light emitting apparatus according to claim 11, wherein the substrate is disposed with a direction normal to a main surface of the substrate pointing away from the first support, the light source being placed on the main surface.

19. The light emitting apparatus according to claim 18, further comprising:

a protrusion (i) on the lens and protruding to the substrate to be in contact with the substrate or (ii) on the substrate and protruding to the lens to be in contact with the lens, wherein the protrusion is provided on the substrate or the lens at a position located away from the first support.

20. The light emitting apparatus according to claim 11, wherein the light source includes:

a light emitter that emits the light; and a mounting substrate on which the light emitter is placed, wherein the mounting substrate is disposed with a direction normal to a mounting surface of the mounting substrate pointing away from the first support, the light emitter being placed on the mounting surface.

21. The light emitting apparatus according to claim 11, further comprising:

adhesive portions disposed between the light source and the substrate to bond the light source and the substrate together, wherein the adhesive portions include a first adhesive portion located adjacent to the first support and a second adhesive portion located away from the first support, and a width of the first adhesive portion from the substrate to the light source is greater than a width of the second adhesive portion.

* * * * *